United States Patent [19]

Takanashi et al.

[11] Patent Number: 4,945,423
[45] Date of Patent: Jul. 31, 1990

[54] REPRODUCING APPARATUS FOR CHARGE LATENT IMAGE RECORDING MEDIUM

[75] Inventors: Itsuo Takanashi, Kamakura; Shintaro Nakagaki, Fujisawa; Hirohiko Shinonaga; Tsutou Asakura, both of Yokohama; Masato Furuya; Hiromichi Tai, both of Yokosuka, all of Japan

[73] Assignee: Victor Company of Japan, Ltd., Yokohama, Japan

[21] Appl. No.: 396,203

[22] Filed: Aug. 21, 1989

Related U.S. Application Data

[63] Continuation-in-part of Ser. No. 301,324, Jan. 24, 1989, which is a continuation-in-part of Ser. No. 139,005, Dec. 29, 1987, Pat. No. 4,831,452.

[30] Foreign Application Priority Data

Aug. 19, 1988 [JP] Japan .................................. 63-205771
Sep. 30, 1988 [JP] Japan .................................. 63-248091

[51] Int. Cl.⁵ ...................... H04N 1/29; H04N 5/74; H04N 5/80; H04N 5/84; G01D 15/06
[52] U.S. Cl. ..................................... 358/300; 358/236; 358/233; 346/155; 346/160
[58] Field of Search ............... 358/300, 209, 230, 231, 358/233, 236, 225, 241, 296, 471; 346/160, 155, 153.1

[56] References Cited

U.S. PATENT DOCUMENTS

| | | | |
|---|---|---|---|
| 3,723,651 | 3/1973 | Gorog | 358/236 |
| 4,040,047 | 8/1977 | Hareng | 358/236 |
| 4,564,853 | 1/1986 | Egan | 346/160 |
| 4,692,779 | 9/1987 | Ando | 346/160 |
| 4,819,084 | 4/1989 | Bark | 358/296 |

*Primary Examiner*—George H. Miller, Jr.
*Assistant Examiner*—Scott A. Rogers
*Attorney, Agent, or Firm*—Fleit, Jacobson, Cohn, Price, Holman & Stern

[57] ABSTRACT

A reproducing apparatus which reproduces a charge latent image recorded in a recording medium. The apparatus has an electromagnetic radiation source, an optical system for leading an electromagnetic radiation ray emitted from the electromagnetic radiation source in a direction toward a recording medium on which an object information to be read is prerecorded as a charge latent image, and a read head arranged closely facing to the recording medium and arranged in series in a travelling path of the electromagnetic radiation ray. The read head is of a multilayer structure comprising a support base plate, a photo modulation material layer for generating a mode modulation of said electromagnetic radiation ray which passes the photo modulation material layer therethrough in response to intensity of an electric field by said charge latent image, and an electrode for applying a predetermined electric field to said photo modulation layer, and for allowing to receive the electromagnetic radiation ray in a read wavelength range and transmit thereof to the photo modulation layer, an output surface facing to a processor for emitting thereto the electromagnetic ray having passed through the electrode and the photo modulation layer, said processor processing the electromagnetic ray modulated by going through the photo modulation material layer and outputted from the output surface.

25 Claims, 17 Drawing Sheets

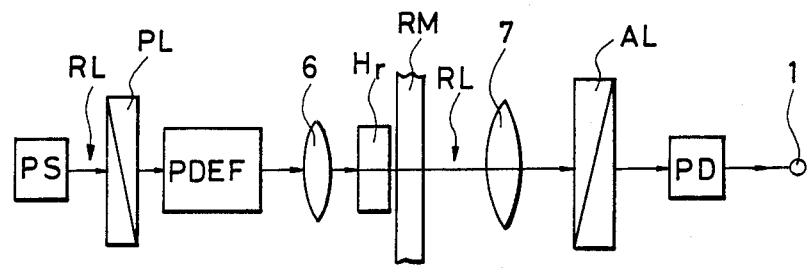
F I G. 4
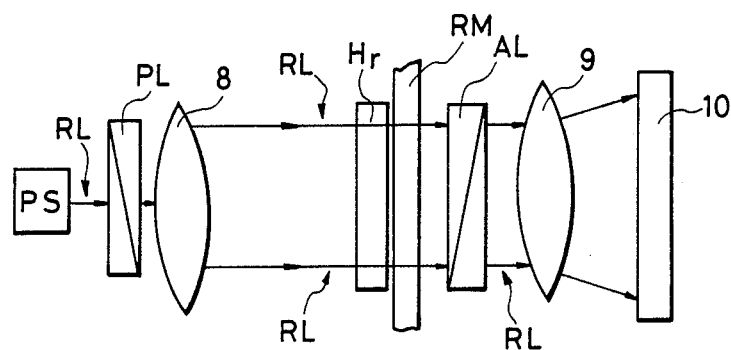
F I G. 5
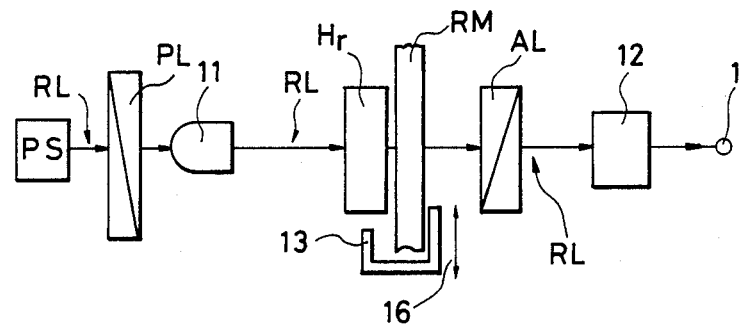
F I G. 6

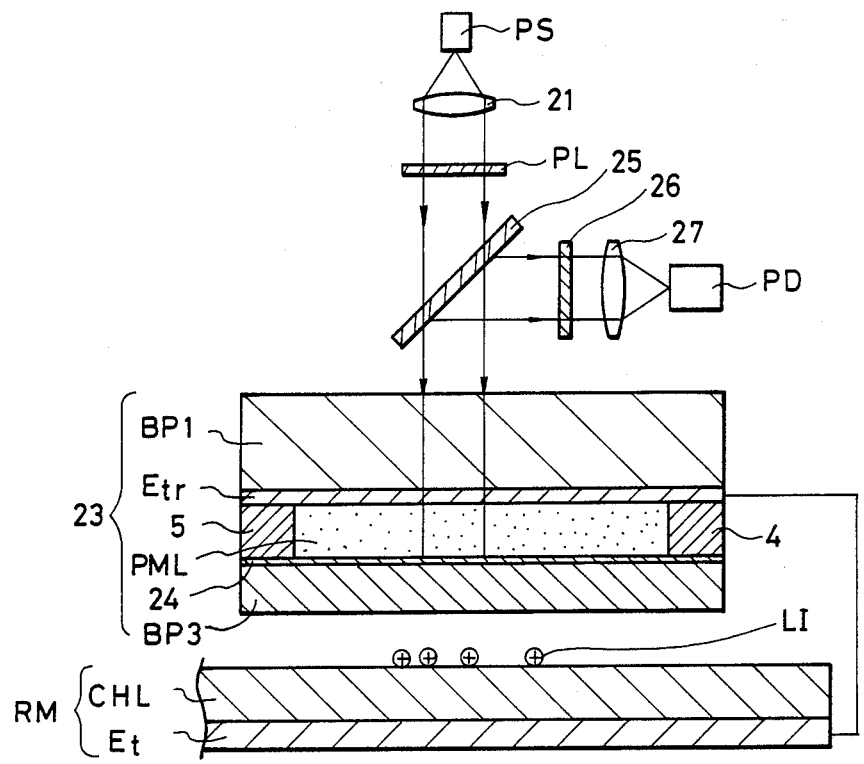
F I G. 13
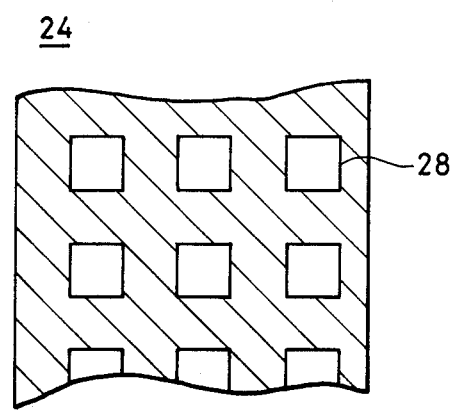
F I G. 14

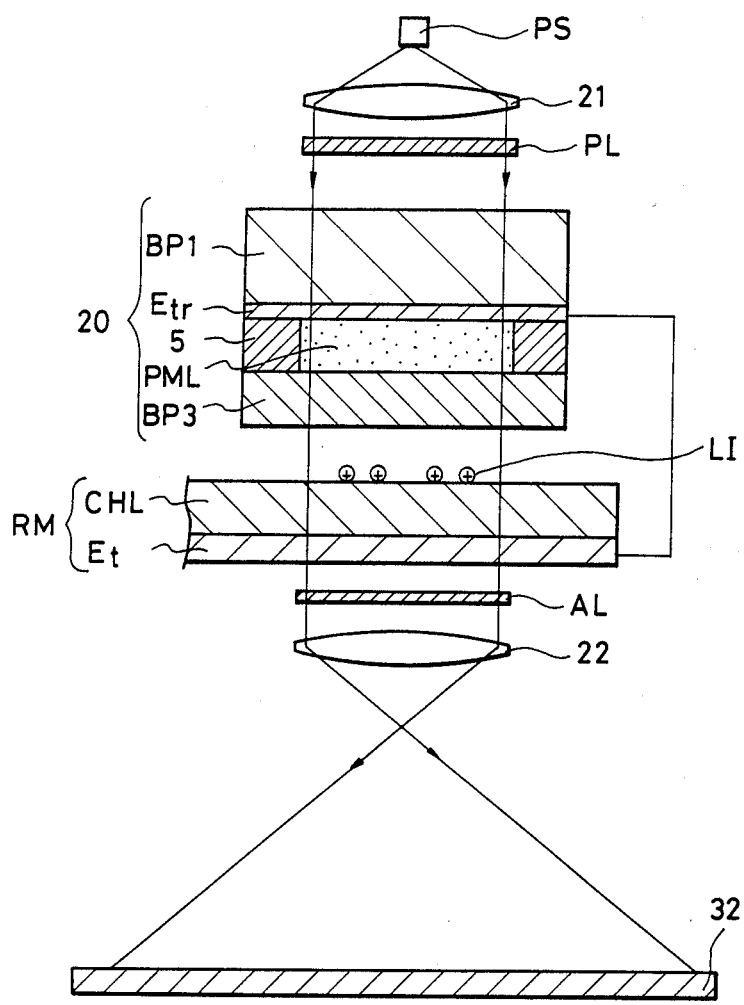
F I G. 16

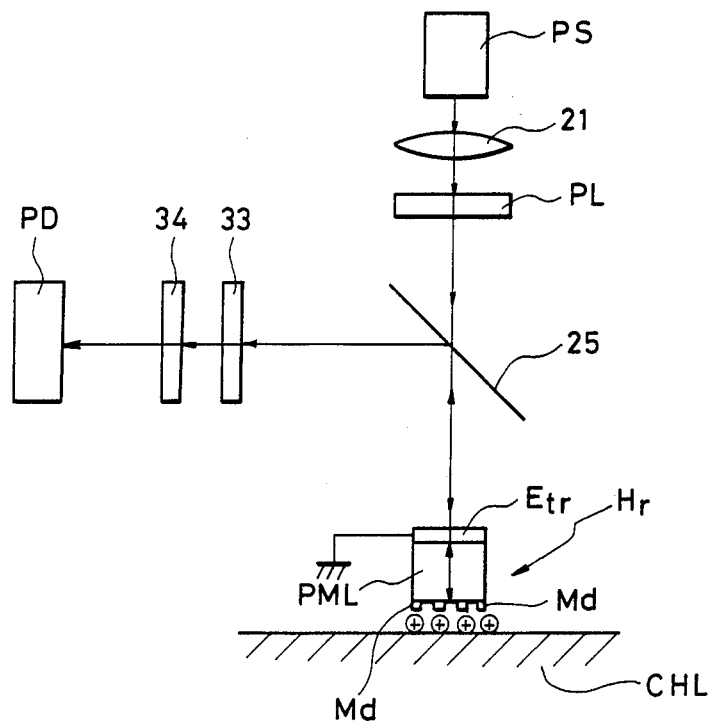
F I G.17
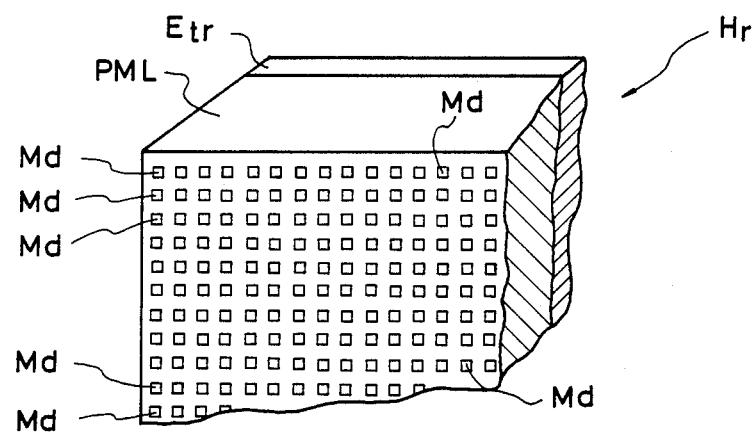
F I G.18

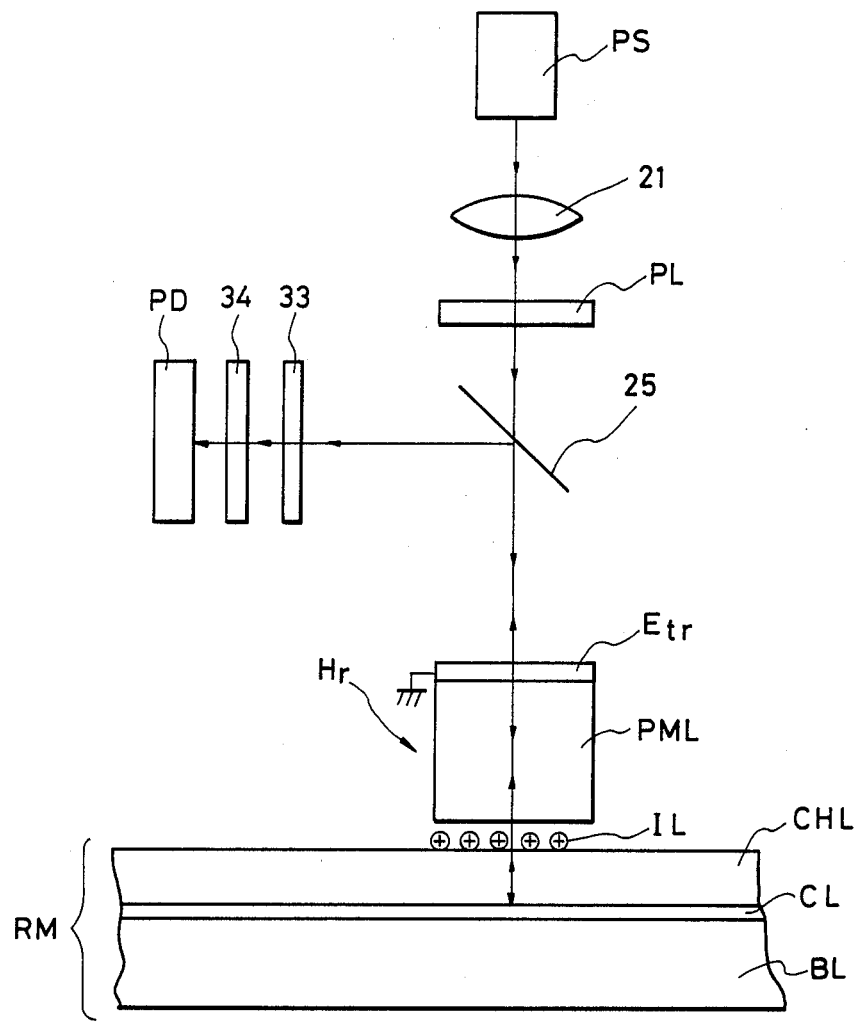
F I G. 19

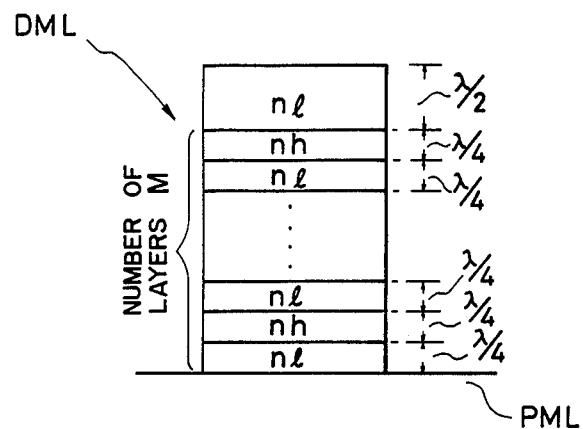
F I G. 26
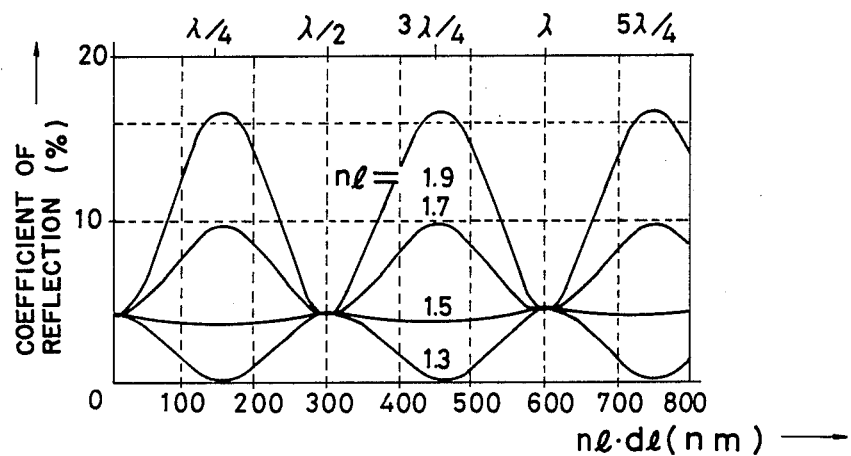
F I G. 27

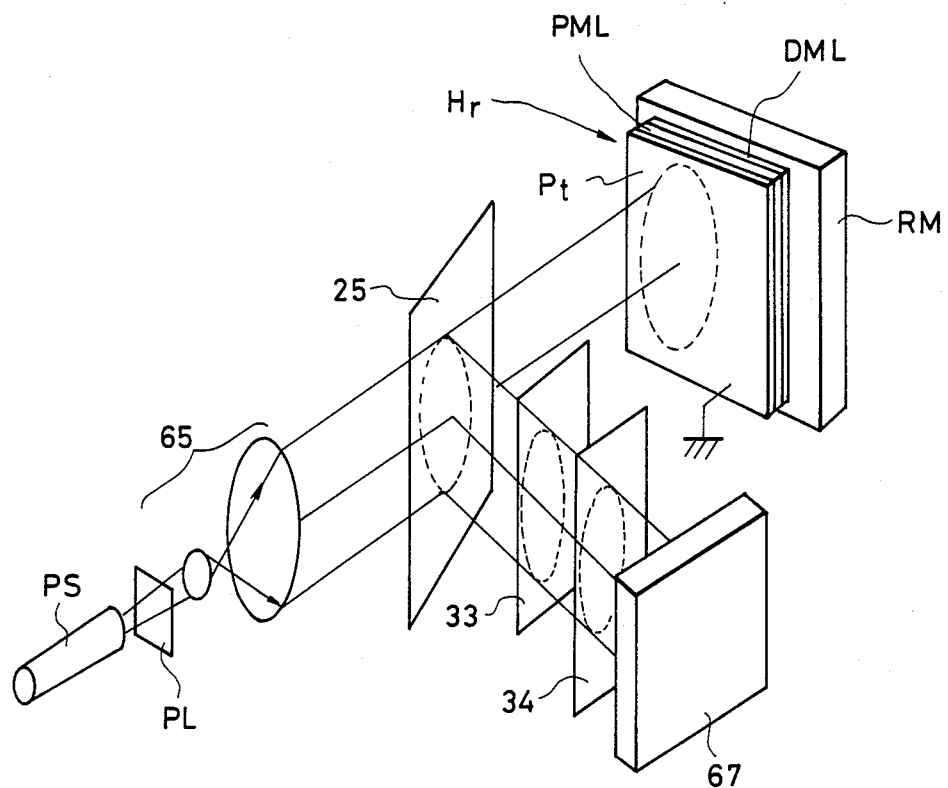
F I G. 33

REPRODUCING APPARATUS FOR CHARGE LATENT IMAGE RECORDING MEDIUM

This is a continuation-in-part (CIP) application of the U.S. application Ser. No. 301,324 filed on Jan. 24, 1989, which is a CIP of U.S. application Ser. No. 139,005 filed Dec. 29, 1987 which is now U.S. Pat. No. 4,831,452 issued May 16, 1989.

BACKGROUND OF THE INVENTION

This invention relates to a reproducing apparatus for a charge latent image recording medium.

In compliance with an increased demand for a reproduced image with high picture quality and high resolution in recent years, as well known, various systems such as so-called EDTV (Extended Definition TV) system, or HDTV (High Definition TV) system have been proposed also for the television system. In order to obtain a reproduced image with high picture quality and high resolution, it is required to provide an image pickup device capable of producing a video signal from which a high picture quality and high resolution image can be recreated. However, for conventional image pickup devices using an image pickup tube, it is difficult to generate such a video signal. The reasons thereof are as follows: Since there is a limit in reduction of the diameter of an electron beam in the pickup tube, high resolution image reproduction by reduction of the diameter of the electron beam cannot be expected. Alternatively, if the target area of the pickup tube is increased, the level of the output signal will be reduced because of the increased output capacity which is proportional to the area of the target. Therefore, high resolution image reproduction by the increase of the target area cannot be realistic. Further, in the case of an image pickup device for a moving picture, since the frequency range of such a video signal reaches several tens to several hundreds MHz for implementation of the high resolution image, the increase of output capacity i.e. the increase of target area is not preferable.

On the other hand, an increase of pixels or downsizing a pixel of solid state image sensors has difficulties known to the industry.

As stated above, conventional image pickup devices either of pickup tube or solid state sensor could not satisfactorily generate such a video signal to provide a reproduced image of high picture quality and high resolution because of the inevitable use of an image sensor for the construction thereof. In order to solve this, the assignee of this application has already proposed an imaging system and a recording system to obtain a high resolution optical image by an image pickup device using a photo-to-photo transducer, and to record such an optical image as a charge image of high resolution onto a charge accumulation layer (or a charge hold layer) by using a photo-to-charge transducer Naturally, in the implementation of such an imaging system and recording system proposed by the assignee of this application, a comparably capable read out system is required which reproduces such a charge image recorded on a recording medium as an electric signal. However, no satisfactory reproducing apparatus therefor has been available to date.

SUMMARY OF THE INVENTION

An object of this invention is to provide a reproducing apparatus capable of reading out, as an electric signal, a charge image recorded on a recording medium.

Another object of this invention is to provide a read head suitable for such a reproducing apparatus.

According to this invention there is provided a reproducing apparatus for a charge latent image recording medium comprising:

an electromagnetic radiation source, an optical system for leading an electromagnetic radiation ray emitted from said electromagnetic radiation source in a direction toward a recording medium on which an object information to be read is prerecorded as a charge latent image, and a read head arranged closely facing to said recording medium and arranged in series in a travelling path of said electromagnetic radiation ray, said read head being of a multilayer structure comprising a support base plate, a photo modulation material layer for generating a mode modulation of said electromagnetic radiation ray which passes the photo modulation material layer therethrough in response to intensity of an electric field by said charge latent image, and an electrode for applying a predetermined electric field to said photo modulation layer, and for allowing to receive the electromagnetic radiation ray in a read wavelength range and transmit thereof to said photo modulation layer, an output surface facing to a process means for emitting thereto the electromagnetic ray having passed through the electrode and the photo modulation layer, said process means processing the electromagnetic ray modulated by going through the photo modulation material layer and outputted from the output surface.

BRIEF DESCRIPTION OF THE DRAWINGS

In the accompanying drawings:

FIG. 4 is a schematic diagram showing an arrangement of a second embodiment according to this invention, FIG. 5 is a schematic diagram showing an arrangement of a third embodiment according to this invention, FIG. 6 is a schematic diagram showing an arrangement of a fourth embodiment according to this invention, FIG. 13 is a schematic diagram of an arrangement of a seventh embodiment of a reproducing apparatus according to this invention, FIG. 14 is a plan view showing a modification of a metal mirror, FIG. 16 is a schematic diagram showing an arrangement of a ninth embodiment of a reproducing apparatus according to this invention, FIG. 17 is a schematic diagram showing an arrangement of a tenth embodiment of a reproducing apparatus according to this invention, FIG. 18 is a perspective view showing a reflection mirror of a read head in the embodiment shown in FIG. 17, FIG. 19 is a schematic diagram showing an arrangement of an eleventh embodiment of a reproducing apparatus according to this invention, FIG. 26 is a schematic diagram showing a dielectric reflective film of a read head in a fifteenth embodiment of a reproducing apparatus according to this invention, FIG. 27 is a graph showing a response of the dielectric reflective film shown in FIG. 26, FIG. 33 is a schematic diagram showing an arrangement of a twenty first embodiment of a reproducing apparatus according to this invention.

DESCRIPTION OF THE PREFERRED EMBODIMENTS

Figure 1:
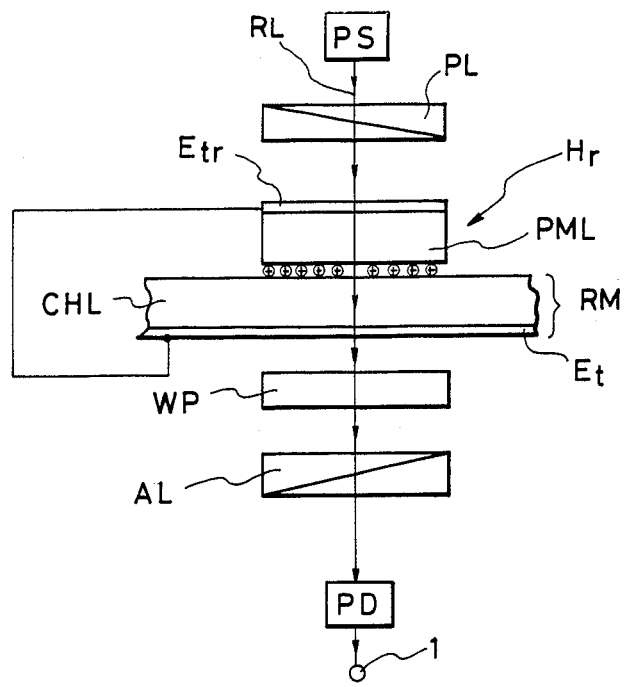
FIG. 1 is a schematic diagram showing an arrangement of a first embodiment of a reproducing apparatus according to this invention.

FIG. 1 is an explanatory view showing an embodiment of a reproducing apparatus for a charge latent image recording medium according to this invention. In this figure, PS denotes a source for generating a reading light RL, i.e., an electromagnetic radiation or radio active ray, which is used for reading (reproducing) information recorded on a recording medium. In the all embodiments which will be described in this specification, a laser light source is used as an example of the electromagnetic radiation source. It is to be noted that the term of the electromagnetic radiation ray means, throughout this invention, a light in a broad sense, i.e., a radiation ray in the entire band of a radiation ray called an electromagnetic wave (from the region of γ-ray, or X-ray, etc. up to a long wavelength band of a radio wave). A polarizer PL is positioned in a traveling path of the reading light RL. However, when the light source PS for reading light irradiates a predetermined linear polarized light, such a polarizer PL is unnecessary. An optical read head Hr and a recording medium RM on which recording information is recorded in the form of a charge latent image are arranged in a further traveling path of the reading light RL. The recording medium RM is of a multilayer structure comprising a transparent electrode Et permitting the reading light RL to be transmitted therethrough (e.g., a transparent electrode comprised of, e.g., an ITO (Indium-Tin Oxide) film) and a transparent charge latent image hold member CHL permitting the reading light RL to be transmitted. For the charge latent image hold member CHL in the recording medium RM, there may be used a material layer which has such a high insulating property enabling a charge latent image formed therein to be held for a long period of time, and which permits a light in a wavelength range of the reading light to be transmitted. For example, an insulating layer formed by a high molecular material may be used for this purpose.

For such a recording medium RM, there may be used recording media in the form of tape, disk, sheet, card, and the like, but any other shape or configuration may be also taken. Further, for the recording medium RM, both rigid and flexible recording media may be selectively used.

Furthermore, a wave-plate WP, an analyzer AL, and a photodetector PD are provided in series in the traveling path of the reading light RL. An output of the photodetector PD is taken out from an output terminal 1. The wave-plate WP is provided according to need in rendering an optical bias to the photodetector PD.

Figures 2, 3:
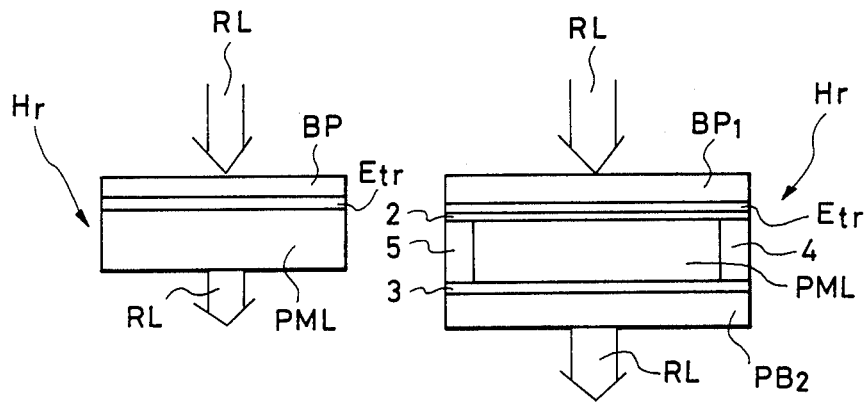
FIG. 2 is a cross sectional view showing an example of a read head used in the embodiment of FIG. 1.
FIG. 3 is a cross sectional view showing another example of the read head used in the embodiment of FIG. 1.

The optical read head shown in FIG. 2 is of a multilayer structure comprising a base plate BP made of a material permitting the reading light RL to be transmitted therethrough, a transparent electrode Etr permitting the reading light RL to be transmitted, and a light or photo modulation layer member PML comprised of a material having an electrooptical effect to change the state of light in response to an applied voltage (e.g., lithium niobate single crystal, $LiTaO_3$, BSO).

The optical read head Hr shown in FIG. 2 is arranged close to the recording medium RM on which a charge latent image is previously formed. When an electric field of the charge latent image in the recording medium RM is applied to the light modulation layer member PML, the layer of the material having electrooptical effect, which constitutes the light modulation layer member PML, become active to change the state or mode e.g. a phase difference between an ordinary light and an extraordinary light passing through the layer in response to the intensity of the electric field applied thereto. Consequently, a readout light is generated with the plane of polarization of the incident light being rotated (modulated) in response to the given electric field applied thereto. Accordingly, by passing, through the analyzer AL, the reading light RL which has been passed serially through the optical read head Hr constructed as shown in FIG. 2 and the recording member RM, a reading light having a light intensity modulated pattern corresponding to the charge pattern of the charge latent image on the recording medium RM is obtained.

If a scatter type liquid crystal whose degree of scattering for the incident light in response to the intensity of the applied electric field or a scatter type PLZT is used, no analyzer AL will be needed, because the read-out light is modulated in intensity when outputted from the scatter type material. There are two types of scatter type liquid crystal or scatter type PLZT, i.e. one type of which scatters at presence of electric field and another type of which scatters at no electric field applied and does not scatter at presence of electric field. Both types can be used as the light modulation layer PML.

Further, an optical read head shown in FIG. 3 is of a multilayer structure comprising base plates BP1 and BP2 of a material allowing the reading light RL to be transmitted therethrough, a transparent electrode Etr permitting the reading light RL to be transmitted therethrough, an aligning film 2, a photo modulation material member PML formed by a liquid crystal sealed between spacers 4 and 5 exhibiting an electric field scattering effect, such as nematic liquid crystal, and an aligning film 3.

The optical read head Hr shown in FIG. 3 is arranged close to the recording medium RM on which a charge latent image is formed, and an electric field of the charge latent image in the recording medium RM is caused to be applied to the light modulation layer member PML. As a result, the material layer comprised of a liquid crystal layer such as a nematic liquid crystal exhibiting optical rotation effects varying in response to the strength of an applied electric field become active to change an optical rotary power of the light passing through the layer in response to the electric field applied thereto. Accordingly, by passing, through the analyzer AL, the reading light RL which has been passed serially through the optical read head Hr constructed as shown in FIG. 3 and the recording member RM, a reading light having a light intensity pattern corresponding to a charge pattern of the charge latent image of the recording medium RM is obtained.

In view of this, a procedure is taken in the reproducing apparatus for charge latent image recording medium shown in FIG. 1 to arrange the optical read head Hr close to the recording medium RM including the charge latent image hold member CHL on which a charge latent image is formed to allow the transparent electrode Et of the recording medium RM and the transparent electrode Etr of the optical read head Hr to have the same potential, thus to irradiate a reading light RL from the light source PS for reading the charge latent image. By taking such a procedure, the reading light RL is incident to the photodetector PD along an optical path including the polarizer PL, the optical read head Hr, the recording medium RM, the wave-plate WSP, and the analyzer AL.

To the light modulation layer member PML of the optical read head Hr disposed close to the recording medium RM, an electric field of a charge latent image recorded in the charge latent image hold member CH provided in the recording medium RM is applied.

Accordingly, either in the case where the read head Hr used in FIG. 1 is a structure shown in FIG. 1 or a structure shown in FIG. 2, the reading light which has been transmitted in series through the optical read head Hr and the recording medium RM is modulated of the plane of polarization thereof as previously described in response to the electric field applied correspondingly to the distribution of the magnitude of charges of the charge latent image recorded in the recording mrdium RM. Thus, a light incident to the photodetector PD passing through the analyzer AL in such that its light intensity is changed in correspondence with the charge latent image recorded in the recording medium RM.

Accordingly, an electric signal corresponding to the distribution of the magnitude of charges of the charge latent image recorded in the recording medium RM is output from the photodetector PD to the output terminal 1.

The serial transmitting sequence of the reading light RL may either be from the optical read head Hr to the recording medium RM, or vice versa.

When a two dimensional scanning of reading light is performed for a recorded charge image, a video signal output from the photodetector PD corresponds to a charge intensity distribution of the two-dimensional charge latent image having a high resolution of the charge latent image recorded in the recording medium RM. Accordingly, where, e.g., a laser beam having a diameter of one micron is used as the reading light, a video signal corresponding to a high picture resolution of 1000 lines/1 mm can be generated.

As an alternative, the same effect can be obtained by making the beam size of the reading light sufficiently large to irradiate the charge latent image at a time with use of a photodetector of two-dimensional array having a high resolution capability.

FIGS. 4 to 6 are schematic diagrams showing arrangement of the second to fourth embodiments of a reproducing apparatus for a charge latent image recording medium according to this invention, respectively. In either case, the optical read head Hr and the recording medium RM are arranged close to each other.

Initially referring to FIG. 4, there is shown a second embodiment of a reproducing apparatus for a charge latent image recording medium according to this invention. This reproducing apparatus is constructed to transmit a reading light RL irradiated from the light source PS through an analyzer PL provided optionally to allow it to be incident to a light or photo deflector PDEF, thereafter to deliver it from the light deflector PDEF to the optical read head Hr then to the recording medium RM where the passing light is polarized in the form of a predetermined polarization mode.

For the light deflector PDEF, where the photodetector PD used in the reproducing apparatus for a charge latent image recording medium is a line sensor, a deflector of a structure permitting a reading light RL deflected only in one direction to be incident to the line sensor may be used. Further, where the photodetector PD used in the reproducing apparatus for a charge latent image recording medium is a two-dimensional sensor, a deflector of a structure permitting a reading light RL deflected in two directions perpendicular to each other to be incident to the two-dimensional sensor may be used.

The reading light RL deflected in the form of a predetermined deflection form in the photo deflector PDEF is incident to scan the optical read head Hr through the lens 6. The photo modulation layer member PML in the optical read head Hr emits a reading light RL of which plane of polarization is changed in dependency upon an electric field distribution corresponding to a charge magnitude distribution in the charge latent image recorded in the recording medium RM. The reading light RL thus emitted is transmitted through the transparent recording medium RM and is then incident to the analyzer AL through the lens 7.

The analyzer AL delivers, to the photo detector PD, a light having an intensity variation which has been changed in accordance with the state of rotation of the plane of polarization of the reading light RL incident to the analyzer AL. As a result, an electric signal of a time sequence corresponding to a charge magnitude distribution of the charge latent image recorded in the recording medium RM and to the above-mentioned scanning is output from the photo detector PD to the output terminal 1.

In this embodiment, the recording medium RM is also subjected to sub-scanning or feeding operation in dependency upon the form of light deflection in the photo deflector PDEF.

Further, the reproducing apparatus for a charge latent image recording medium shown in FIG. 4 may be constructed to place the photo deflector PDEF thereof in a state where it effects a two-dimensional photodeflecting operation thereafter to project a reading light RL emitted from the recording medium RM onto a screen as an optical projection system, thus making it possible to display a two-dimensional optical image.

For such a photo deflector PDEF, electric photo deflection means and mechanical deflection means using a polygon mirror or a swing mirror, etc. may be used.

Referring to FIG. 5, there is shown a third embodiment of a reproducing apparatus for a charge latent image recording medium according to this invention. In accordance with this recording apparatus, a reading light RL irradiated from the light source PS is subjected to linear polarization having a predetermined plane of polarization by a polarizer PL provided optionally. Thereafter, the polarized reading light beam thus obtained is enlarged to have a large cross section by a lens 8, and is then incident to the optical reading head Hr. The photo modulation material layer member PML in the optical reading head Hr emits a reading light RL placed in a state where its plane of polarization has been changed in dependency upon an electric field distribution based on a charge magnitude distribution of a charge latent image recorded in the recording medium RM. The reading light RL thus emitted is transmitted through the transparent recording medium RM, and is then incident to the analyzer AL.

The analyzer AL projects a light changed to an intensity modulation caused in response to the rotation of the polarization plane of the reading light RL incident thereto, onto a screen 10 through a lens 9 of the projection system. Thus, a large size of two-dimensional optical image is simultaneously displayed on the screen 10.

Referring to FIG. 6, there is shown a fourth embodiment of a reproducing apparatus for a charge latent image recording medium according to this invention. In accordance with this reproducing apparatus, a reading light RL irradiated from the light source PS is subjected to linear polarization having a predetermined plane of polarization by a polarizer PL provided optionally. Thereafter, the polarized light thus obtained is incident to the optical read head Hr as a single beam reading light RL having a linear cross section extending in one direction by a cylindrical lens 11.

The photo modulation layer member PML in the optical read head Hr emits a linear cross section single beam of reading light RL placed in a state where its plane of polarization has been modulated in response to an electric field distribution based on a charge magnitude distribution of the charge latent image recorded in the recording medium RM. The reading light RL thus emitted is transmitted through the transparent recording medium RM, and is then incident to the analyzer AL.

The analyzer AL delivers, to the line sensor 12, the beam of light of which intensity has been modulated in response to the rotation of plane of polarization of the linear cross section single beam of the reading light RL incident to the analyzer AL. As a result, an electric signal of a time sequential and corresponding to a charge magnitude distribution in the single linear line of the charge latent image recorded in the recording medium RM is output from the line sensor 12 to the output terminal 1.

The recording medium RM is subjected to sub-scanning or feeding operation moving in a predetermined movement mode by a movable stage 13 in a direction 16 perpendicular to the extending direction of the linear cross section single beam of the reading light RL. Thus, the two-dimensional charge image recorded on the recording medium RM changes to an electric signal in time domain obtained as a result of scanning the line sensor 12 and sub-scanning of the recording medium RM. The electric signal thus obtained is delivered to the output terminal 1.

Figure 7:
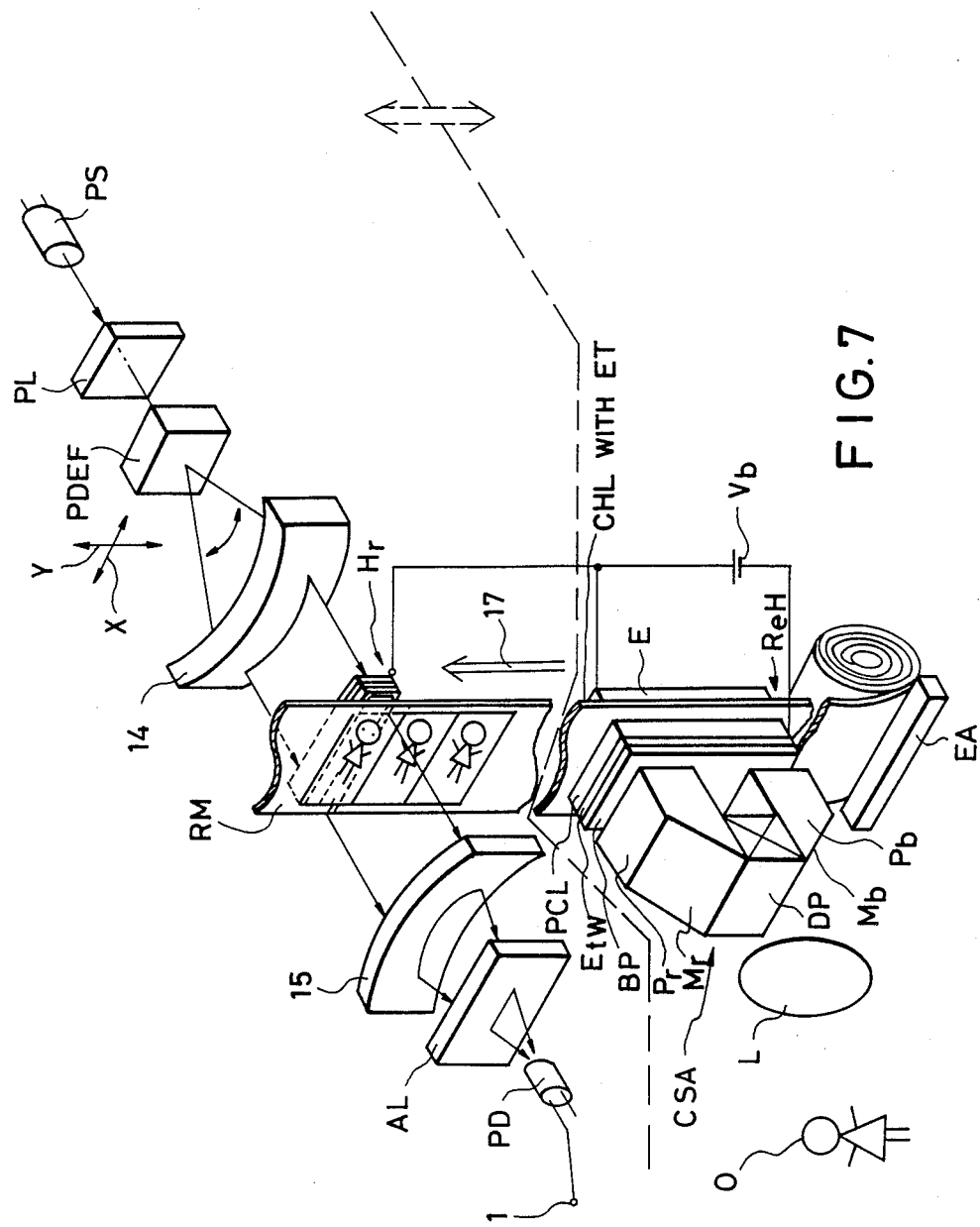
FIG. 7 is a perspective view showing a fifth embodiment of a reproducing apparatus according to this invention, which is capable of obtaining three color separated images.
Figure 8:
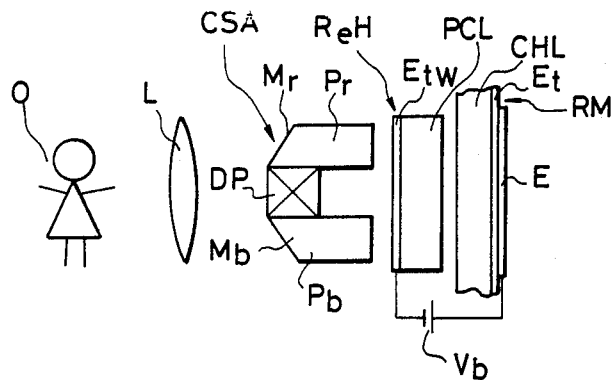
FIG. 8 is an explanatory view showing how a charge latent image recording onto a recording medium is conducted.

Referring to FIG. 7, there is shown, as a perspective view, a fifth embodiment of a reproducing apparatus for a charge latent image recording medium according to this invention. This reproducing apparatus is of a structure including a recording system for separating an optical image of an object into three color separated optical images by a three color separation optical system to record them as three respective charge latent images onto a recording medium RM (the portion indicated below dashed line in FIG. 7), and a reproducing system for reproducing the charge latent images recorded in the recording medium by the above-mentioned recording system (the portion indicated above the dashed line in FIG. 7). The construction and the operation of the recording system used for forming charge latent images on the recording medium RM will be first described with reference to FIGS. 8 to 11. As shown in FIG. 8, the recording medium RM comprises an electrode Et made of a transparent conductive material and a charge latent image hold member CHL. This recording medium RM is transported by a drive unit not shown.

Further, a recording head ReH is of a multilayer structure including a transparent support base plate (labeled BP in FIG. 7) which is not shown in FIG. 8, a transparent electrode Etw, and a photo conductive layer member PCL.

First, a three color separation system CSA is removed from the recording apparatus shown in FIG. 7 for a monotone image recording. Then, an optical image of an object O is formed on the photoconductive layer member PCL in the recording head ReH by an imaging lens L. At this time, when a voltage is applied from a power supply Vb to the transparent electrode Etw in the recording head ReH and the transparent electrode Et of the recording medium RM through the electrode E in contact with the electrode Et, the electric resistance value of the photoconductive layer member PCL in the recording head ReH changes in dependency upon the optical image of the object O formed on the photoconductive layer member PCL. As a result, an electro-potential latent image corresponding to the optical image of the object is formed on the end surface of the photoconductive layer member PCL of the recording head ReH facing to the charge latent image hold member CHL of the recording member RM. The electro-potential latent image formed on the end surface of the photoconductive layer member PCL is transferred to the charge latent image hold member CHL of the recording medium RM as a charge latent image.

Then, the three color separation optical system CSA is replaced in front of the recording head ReH. Where recording of a color image is conducted, a procedure is taken to first apply a voltage from the power supply Vb across the transparent electrode Etw of the recording head ReH and the transparent electrode Et of the recording medium RM as previously described, thereafter to form an optical image of the object O on the photoconductive layer member PCL in the recording head ReH through the imaging lens L and the three color separation system CSA. The electric resistance of the photoconductive layer member PCL in the recording head ReH varies in accordance with the optical image of the object O formed on the photoconductive layer member PCL. On the end surface of the photoconductive layer member PCL of the recording head ReH facing to the charge latent image hold member CHL of the recording medium RM, there are formed electropotential distributions corresponding to the three images of three different colors as a result of separating an optical image of the object into three colors. Accordingly, charge latent images corresponding to charge distribution on the surface of PCL of the recording head ReH are recorded into respective areas of R, G and B of the recording medium RM shown in FIG. 11.

Figure 9:
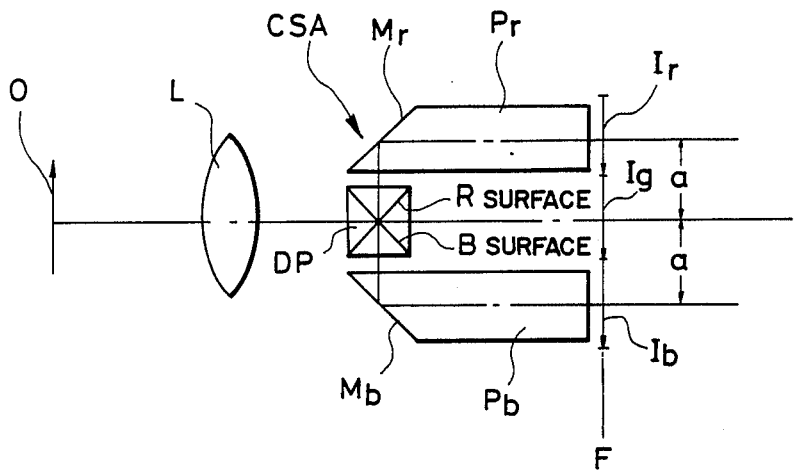
FIG. 9 is a plan view showing the configuration of a three color separation system.
Figure 10:
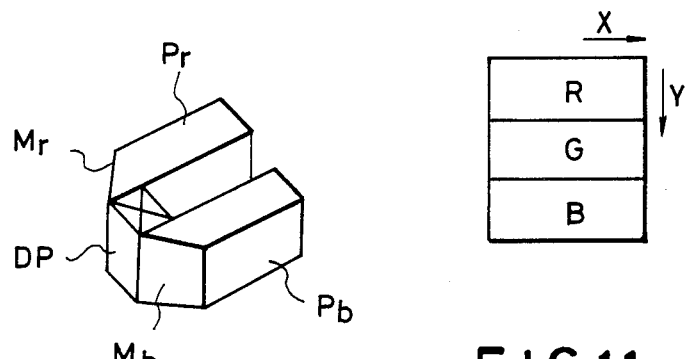
FIG. 10 is a perspective view of the three color separation system shown in FIG. 9.

The entirety of the three color separation optical system CSA is illustrated in FIG. 10 as a perspective view. The constitutional principle is shown in FIG. 9 as a plan view. In FIGS. 9 and 10, Dp represents a dichroic mirror (dichroic prism Dp) in the form of a prism of a structure in which a dichroic mirror (R-plane) allowing a red light to be reflected and allowing green light and blue light to be transmitted and a dichroic mirror (B-plane) allowing a blue light to be reflected and allowing a green light and a red light to be transmitted are perpendicular to each other, Pr represents a prism having a total reflection plane Mr, and Pb represents a prism having a total reflection plane Mb.

In FIG. 9, when a light from the object O is incident to the dichroic prism Dp through an imaging lens L, a green light component of an optical image of the object, which has been transmitted through both the dichroic mirror (R-plane) and the dichroic mirror (B-plane) of the incident light to the dichroic prism Dp, is focused on an image formation plane Ig. Further, a red light component of an optical image of the object reflected on the dichroic mirror R-plane of the dichroic prism Dp is passed through the prism Pr after reflected on the total reflection plane Mr of the prism Pr, and is then focused on an image formation surface Ir within the same plane as the image formation surface Ig and adjacent to the image formation surface Ig. Furthermore, a blue light component of an optical image of the object reflected on the dichroic mirror B-plane of the dichroic prism Dp is passed through the prism Pb after reflected on the total reflection surface Mb of the prism Pb, and is then focused on an image formation surface Ib within the same plane as the image formation surfaces Ig and Ir and adjacent to the image formation surfaces Ig and Ir.

These three image formation surfaces Ig, Ir and Ib are formed within the same plane and are arranged in alignment with each other as previously described.

Namely, since the prism Pr serves to elongate the optical path length for the red light and the prism Pb serves to elongate the optical path length for the blue light, the image formation surface Ig for green light, the image formation surface Ir for red light, and the image formation surface Ib for blue light are brought into a state where they are arranged within the same plane and close in alignment with each other as previously described. The amount of elongation X of the optical path length by the prism Pr and Pb is set so that it equal to a degree of offset a of an optical axis of each color light, i.e., is expressed as X=a.

When an optical path in the prisms Pr and Pr is designated by d and a refractive index of a constituent material in the prism Pr and Pb is designated by n, the amount of elongation X of the optical path by the prisms Pr and Pb is expressed as $X=d(n-1)/n$. Thus, the amount of elongation X of the optical path by the prisms Pr and Pb and the degree of the offset a of the optical axis of each color light can be equal to each other by varying the optical length d in the prisms Pr and Pb and the refractive index n of the constituent material of the prisms Pr and Pb.

As stated above, with the three color separation optical system CSA, three pictorial images having a high resolution are formed at positions of a plurality of image information surfaces in a manner that they are closely aligned each other.

Figure 11:
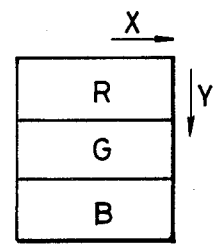
FIG. 11 is an explanatory view of a recording area of three color separated charge latent images.

In apparatus for effecting a recording of a charge latent image shown in FIG. 8, under a state where a predetermined voltage is applied across the transparent electrode Etw in the recording head ReH and the electrode Et of the recording medium RM by the power supply Vb, an optical image of the object O is separated into individual colors through the imaging lens L and the three color separation system CSA, and is formed on three image formation surfaces Ir, Ig and Ib formed within the same plane and close in alignment with each other of the photoconductive layer member PCLS in the recording head ReH. Thus, the electric resistance value of the photoconductive layer member PCL in the recording head ReH varies in dependency upon the optical image of the object O formed thereon. On the end surface of the photoconductive layer member PCL facing to the charge latent image hold member CHL of the recording head ReH, there are formed electropotential distributions corresponding to three charge latent images of three different colors. In response to this potential distribution, charge latent images corresponding to the separated color images of the object are recorded in the charge latent image hold member CHL in the recording medium RM as indicated by R, G and B in FIG. 11. In FIG. 11, an arrow X represents a direction of main scanning and an arrow Y represents a direction of sub scanning or feed.

At the time of the recording operation, the end surface of the photoconductive layer member PCL in the recording head ReH and the charge latent image hold member CHL of the recording medium RM are tightly in contact with each other, or are arranged with a very small gap therebetween. When the recording medium RM is rotated or swinged away upon completion of the recording operation for a unit recording/reproducing area, the end surface of the photoconductive layer member PCL in an optical image-to-charge image transducer (recording head ReH) and the charge latent image hold member CHL of the recording medium RM are spaced to each other.

EA shown below in FIG. 7 represents an eraser for erasing recorded contents if there is some already recorded in the form of a charge latent image in the recording medium RM, prior to carrying out a new recording.

The reproducing apparatus for charge latent image recording media according to this invention shown in FIG. 7 is constructed to transmit a reading light RL irradiated from the light source PS through a polarizer PL provided when needed to deliver it to a photo deflector PDEF, thereafter to deliver it from the photo deflector PDEF to the optical read head Hr and the recording medium RM through a doublet spherical lens (fθ lens) 14 as a light deflected in a predetermined deflection form.

For the photo deflector PDEF, a deflector in the form of single dimensional deflection or two-dimensional deflection, is used depending upon whether the photo detector PD used in the reproducing apparatus for charge latent image recording medium is a line sensor or a two-dimensional sensor.

The reading light RL deflected in the predetermined form of deflection by the photo deflector PDEF is incident to the optical read head Hr through the doublet spherical lens 14 as previously described. Since the optical read head Hr is arranged close to the recording medium RM, the modulation material layer member PML in the optical read head Hr emits a reading light RL having a plane of polarization modulated when passing through the optical read head Hr in response to an electric field generated from a charge magnitude distribution in the charge latent image recorded in the recording medium RM. The reading light RL thus emitted is passed through the transparent recording medium RM, and is then incident to the analyzer AL through a doublet spherical lens 15.

The analyzer AL transforms the incident reading light RL to a light having an intensity modulated in response to the degree of rotation of the plane of polarization in the reading light RL and delivers it to the photo detector PD. Thus, an electric signal of in time domain corresponding to a charge magnitude distribution when the charge latent image recorded in the recording medium RM is scanned accordingly is output from the photo detector PD to the output terminal 1.

It is to be noted that the recording medium is also to be subjected to sub-scanning or feeding in the form of a predetermined sub-scanning in relation to the form of light deflection in the photo deflector PDEF, as the recording medium RM is moved in a predetermined movement form in a direction indicated by an arrow 17.

In the embodiment of the reproducing apparatus for charge latent image recording medium according to this invention shown in FIG. 7, the arrangement is such that the both recording and reproduction are performed in a single system as the recording medium is moved from a recording station to a reproducing station in the system as indicated by the arrow 17. However, in carrying out this invention, the recording station and the reproducing system may be separated each other to be independed apparatuses where the recording medium recorded by the recording apparatus is replaced to a reproducing apparatus which may be remote from the recording system, thus permitting the recorded information reproduced from the recorded recording medium at a different location.

In respective embodiments which have been described, a signal output from the photo detector PD may be utilized in various utilization forms, e.g., after the appropriate signal processing, the processed signal may be delivered to a printer to provide a hard copy, or delivered to a display unit to provide a soft copy, or delivered to an electronic file system to build a file; or the utilization may be storing a recording medium RM as is in a state where information is recorded on the charge latent image hold member CHL thereof and reproducing such a recording medium RM later. In addition, a signal which has been read out as optical information may be subjected to optical signal processing in the form of optical information without converting it to an electrical signal for further optical utilization.

Figure 12:
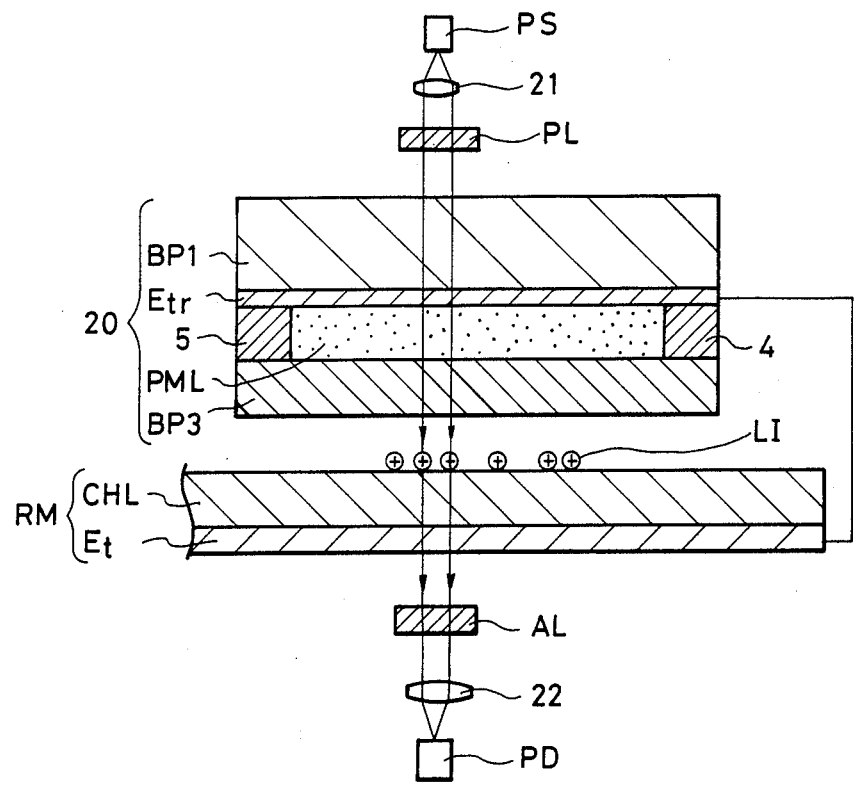
FIG. 12 is a schematic diagram of an arrangement of a sixth embodiment of a reproducing apparatus according to this invention.

Referring to FIG. 12, there is shown a sixth embodiment of a reproducing apparatus for a charge latent image recording medium according to this invention. This embodiment is a modification of the embodiments shown in FIGS. 1 and 3.

A read head 20 used in this embodiment comprises a transparent support base plate BP, a transparent electrode Etr provided below the base plate BP, and liquid crystal layers PML respectively enclosed between the transparent electrode Etr, spacers 4 and 5, and a high dielectric constant support base plate BP3. The transparent electrode Etr is electrically connected to the transparent electrode Et of the recording medium RM.

The high dielectric constant support base plate BP3 consists of a material of a ferroelectric crystal such as lithium niobate having a specific dielectric constant of 80 or barium titanate having a specific dielectric constant of 5000, or organic material. By employing such a ferroelectric material, the strength of an electric field applied to the liquid crystal is increased, and the equivalent air thickness of the high dielectric constant support base plate BP3 becomes negligibly small.

In the apparatus of this embodiment, a light emitted from the light source Ps is incident to the liquid crystal layer PML through the lens 21, the polarizer PL, and the transparent support base plate BP1 and the transparent electrode Etr of the read head 20.

The light incident to the liquid crystal PML is modulated in rotation of polarization by an electric field of an electrostatic latent image LI appearing on the surface of the medium insulating film CHL. Such a modulated light passes through the high dielectric constant support base plate BP3, the medium insulating film CHL, the medium electrode Et, the polarizer AL, and the lens 22, and is then detected by a photo detector PD as a change in intensity of the light corresponding to an electrostatic latent image LI.

For providing a high resolution picture, it is desirable to use a laser light source as the light source PS.

Further, a polygon mirror, a galvanomirror, or the like may be used for deflecting the reading light to scan the image LI to generate from the detector PD a signal to reproduce a two-dimensional pictorial image.

In addition, by connecting the transparent electrode Etr and the medium electrode Et to allow both electrodes to have the same potential, an electric field of the charge latent image LI is precisely detected.

Referring to FIG. 13, there is shown a seventh embodiment of this invention. This embodiment is directed to an electrostatic latent image reading apparatus of reflection type in which there are used a read head 23 having a mirror layer 24 for reflecting a reading light put between the liquid crystal layer PML with the spacers 4 and 5 and the high dielectric constant support base plate BP3 of the embodiment shown in FIG. 12, and a half-mirror 25 for changing the direction of the reflected light.

A light, which is emitted from the light source PS and is incident to the read head 23 through lens 21, polarizer PL, semitransparent mirror 25, reaches a mirror layer 24 through transparent support base plate BP1, transparent electrode layer Etr, and liquid crystal layer PML. This light is then reflected on the mirror layer 24 and returns to the transparent support base plate BP1 through liquid crystal layer PML and transparent layer Etr.

This light is subjected to a change in optical rotation caused in the liquid crystal layer PML by an electric field of the charge latent image LI on the recording medium RM.

Further, a light emitted from the read head 23 undergoes changing of direction by the semitransparent mirror 25, and is then incident to the photo detector PD via a polarizer 26 and a lens 27.

For the semitransparent mirror 25, another kind of beam splitter may be used.

Furthermore, for the mirror layer 24 used in this embodiment, a dielectric mirror or a metal mirror may be used. The dielectric mirror is comprised of a lamination of multi-layer films and the metal mirror is comprised of an aluminum film formed by a vacuum deposition method.

Even if a laser beam having a small beam diameter is incident to the read head with in view of detecting a surface potential with a high resolution, since an electric resistance in the extending direction of the mirror layer 24 of conventional design is not adequately large, it is difficult to detect a surface potential with a high resolution.

Particularly, in the case where the mirror layer 24 in the read head 23 is comprised of a two-dimensionally extended aluminum thin film having a good optical characteristic formed by a vacuum film deposition method, even if a charge pattern formed on the surface of a recording body is constituted with a fine distribution of charges, because a potential on the thin film of aluminum conductor constituting the mirror layer 24 which is facing the fine distribution of charges, is uniform over the entire surface thereof, the electric field applied to the liquid crystal layer PML will become inevitably uniform, leading to a fact that it is impossible to detect a charge latent image in high resolution. Accordingly, whatever the minimized diameter of the laser beam used for detection may be, the resolution in detection of a surface potential distribution is determined by the area of the mirror layer 24. Further, where e.g., a dielectric mirror comprised of a two-dimensionally extended multi-layer film is used as the mirror layer 24 in the read head used in the reproducing apparatus, an electric resistance value in a two-dimensionally extending direction in the dielectric mirror is not infinite although it has an electric resistance value higher than that of the thin film of aluminum. This means that a surface potential of the dielectric mirror is gradually averaged in accordance with a time constant determined by an electric resistance R in an extending direction of the dielectric mirror film and an electrostatic capacity C of the photo modulation material layer member PML of the read head, the resolution in detection of a surface potential distribution is lowered with a lapse of time.

Accordingly, where the operation for detecting a charge image is continuously conducted over a long period of time as in the case of reproducing a still picture, it likely happens that a reproduced pictorial image becomes obscure.

To overcome this, as shown in FIG. 14, the metal mirror is divided into segments 28 equivalent to a size of pixel of the charge latent image, thus to arrange such array of small mirrors electrically independent each other so that the small metal mirrors are not in contact with each other.

By employing such a technique, it is possible to read a charge latent image with a resolution of every divided metal mirror. The same technique can be also applied to a dielectric mirror layer.

In the embodiments shown in FIGS. 12 and 13, a photo detector PD is used to convert an intensity modulated light which is derived from an electrostatic latent image LI, to an electric signal to output it. Instead of this, the intensity modulated light may be output as it is. Such an example will be described with reference to FIGS. 15 and 16.

Figure 15:
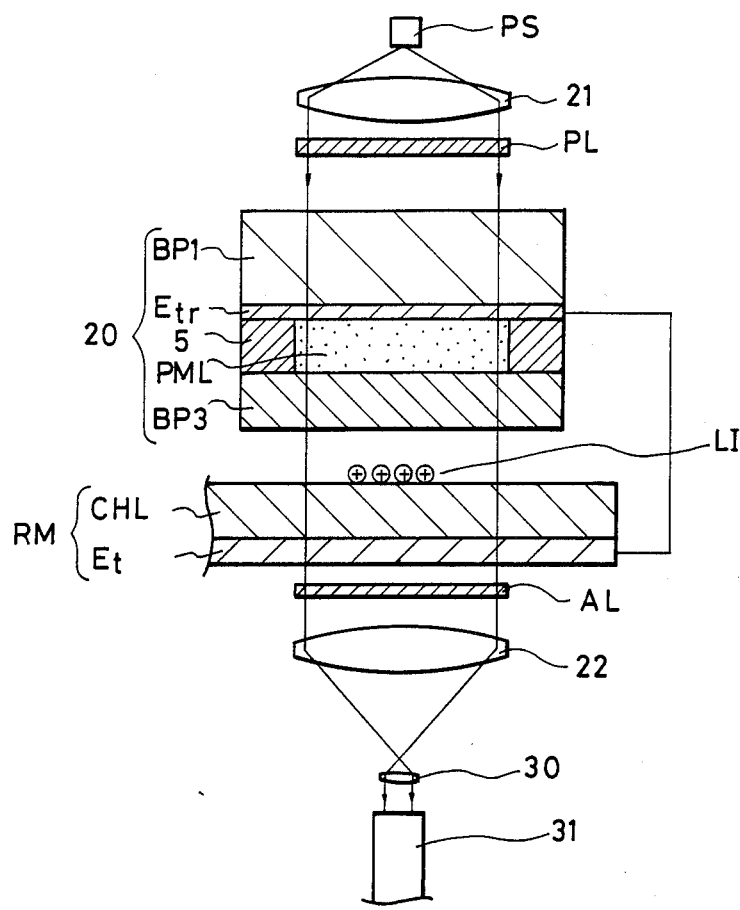
FIG. 15 is a schematic diagram showing an arrangement of an eighth embodiment of a reproducing apparatus according to this invention.

Referring to FIG. 15, there is shown an eighth embodiment of this invention, wherein a lens 30 and a light signal transmission medium 31 are used instead of the photo detector PD in the embodiment in FIG. 12 to output a light signal as it is.

The operation in this embodiment is the same as that in the case of the embodiment in FIG. 12. This embodiment differs from the latter embodiment in that there is employed an arrangement such that a light which has been passed through lens 22 is changed to a straight beam of light by lens 30 to transmit it by optical signal transmission medium 31 such as an optical fiber.

Referring to FIG. 16, there is shown a ninth embodiment, wherein a light which has been passed through lens 22 is projected onto a screen 32 so that the intensity modulated light is expressed as a viewable two-dimensional image as it is. For the screen 32, a frosted glass, etc. may be used.

While the embodiments shown in FIGS. 15 and 16 are both directed to the same electrostatic latent image reproducing apparatus of the transmissive type as that of the embodiment shown in FIG. 12, when such a modification is applied to the both apparatus to replace read head 10 with read head 23 having mirror layer 40, they may be constructed as an electrostatic latent image reproducing apparatus of the reflective type.

Referring to FIG. 17, there is shown a tenth embodiment of this invention corresponding to the embodiment shown in FIG. 13. Since this embodiment has substantially the same construction as that of the embodiment of FIG. 13 except that the read head Hr is not of the liquid crystal type and is not provided with a dielectric base plate BP3, the same components as those in FIG. 13 are designated by the same reference numerals, respectively, and their explanation will be omitted.

In this embodiment, a plurality of reflection mirrors Md are arranged on the surface of the photo modulation material layer member PML of the read head Hr facing to the charge hold member of the recording medium RM. FIG. 18 is a perspective view showing how such reflection mirrors are arranged in arrays.

A plurality of reflection mirrors Md may be, for example, such that a predetermined pattern is constituted by thin films of a conductive material such as aluminum, or that a predetermined pattern is constituted by dielectric mirrors comprised of a multi-layer film. Individual plural reflection mirrors Md, Md, ... shown in FIG. 18 may take an arbitrary shape, not to be limited to the square, and the individual reflection mirrors Md should have a dimension and a pitch in arrangement fine enough so that detection of a potential distribution can be satisfactorily made with a high resolution.

A plurality of reflection mirrors Md of a very small dimension in the read head Hr are easily fabricated on the end surface of the photo modulation material layer member PML of the detection head by applying a well known thin film pattern fabricating technique. For example, where a plurality of reflection mirrors Md, Md, ... are arranged in a manner that each pitch of the array of respective reflection mirrors Md, Md, ... is 4 microns, accordingly an apparatus for detecting a surface potential distribution having 250 lines/mm can be constructed.

Further, it is preferable to provide a mask pattern consisting of a light shielding material having an extremely large electric resistance between respective reflection mirrors Md and Md in constituting the read head Hr. This can prevent a laser beam deflected by, e.g., a photo deflector, from spilling out from portions between respective reflection mirrors Md, Md, ... to the outside. Accordingly, it is prevented that a laser beam escaping from the read head Hr is incident again, thus degrading an accuracy in reading operation.

In the embodiment shown in FIG. 17, after a light emitted from the read head Hr is reflected by the beam splitter 25, it is transmitted through a wave-plate 33 for setting an optical bias, and is then incident to the analyzer 34. The light thus transmitted through the analyzer 34 is transformed to an electric signal by a photo detector PD. Such an electric signal can provide or derive a reproduced pictorial image having a high resolution.

Referring to FIG. 19, there is shown an arrangement of a further embodiment according to this invention. Since the construction of the optical system is similar to that of FIG. 17, the same components as those in FIG. 17 are designated by the same reference numerals, respectively, and their explanation will be omitted.

A recording medium RM used in this embodiment is of a multilayer structure comprising a base plate BL, an electrode CL constituted by a conductive material wherein its surface serves to form a reflection surface with respect to light, and a charge hold layer CHL constituted by a material having a function to hold a charge image and permitting a reading light transmitted therethrough for reading out the charge image thereby.

The charge hold layer CHL may be constituted by using, e.g., silicon resin, and the electrode CL may be constituted by, e.g, a vacuum deposited film of aluminum.

The reason why such a reflection electrode is provided in the recording medium is that the dielectric mirror is not simple to fabricate because it is constructed as a dielectric mirror of a multi-layer film structure, and that it is difficult to constitute a high sensitivity detector head because a portion of a light incident to the dielectric mirror is transmitted therethrough, failing to result in a reflection factor of 100%.

The operation of the embodiment shown in FIG. 19 will now be described. Assuming that an electrostatic latent image IL is formed on the charge hold layer CHL, an electric field by a charge image held by the charge hold layer IL of the recording medium RM is applied to the photo modulation material layer member PML of the read head Hr. A laser beam incident to the photo modulation material layer member PML in the read head Hr changes to either the state of an ordinary light or the state of an extraordinary light (an angle of the plane of polarization in this embodiment) in dependency upon an applied electric field produced by the charge image.

After the laser beam incident from the transparent electrode Etr of the read head Hr is passed through the photo modulation material layer member PML, it is emitted from the read head Hr and is then incident to the recording medium RM. After the beam has passed through the charge hold layer CHL in the recording medium RM, it is reflected by the electrode CL forming a plane of reflection of light. The reflected light thus obtained is passed again through the charge hold layer CHL and the photo modulation material layer member PML of the read head Hr, and is then emitted from the surface of the transparent electrode Etr. The mode of this light is modulated in correspondence with a potential distribution of the charge image of the recording member RM.

Since the reflection factor of light is substantially equal to 100% in such a configuration, a surface charge potential of the recording medium RM can be detected with a high sensitivity.

Figure 20:
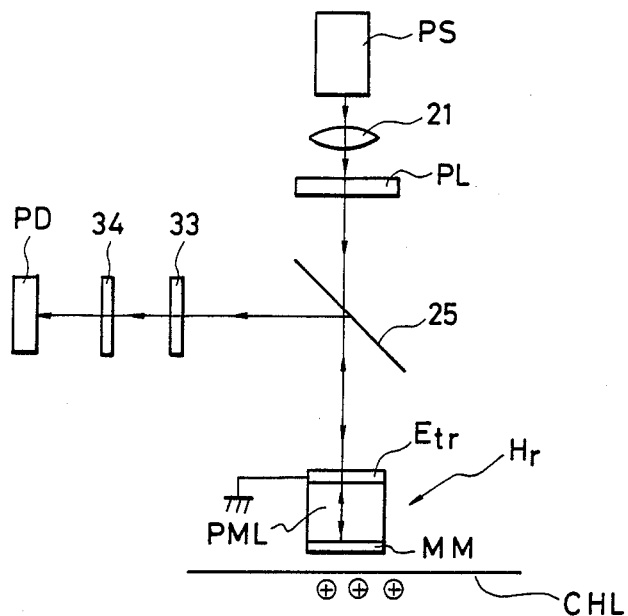
FIG. 20 is a schematic diagram showing an arrangement of a twelfth embodiment of a reproducing apparatus according to this invention.

Referring to FIG. 20, there is shown an arrangement of a twelfth embodiment of a reproducing apparatus according to this invention. Since this embodiment is similar to the embodiment shown in FIG. 17, the same components as those in FIG. 17 are designated by the same reference numerals, respectively, and their explanation will be omitted.

The embodiment of FIG. 20 differs from that of FIG. 17 in the structure of the read head Hr. The read head Hr in this embodiment is of a multilayer structure comprising a transparent electrode Etr, a photo modulation material layer PML, and a reflection mirror MM of a conductive material. The reflection mirror MM of a conductive material is disposed in a manner that it closely faces to the surface of the charge hold layer CHL of the medium to be detected. In this case, the size of the reflection mirror MM is sufficiently small compared to the minimum pixel size to be read. Since an electric field by a charge held by the charge hold layer CHL through the reflection mirror MM of conductive material is applied to the photo modulation material layer member PML in the read head, a laser beam incident to the photo modulation layer member PML is modulated in such a way that the phase difference between the ordinary light and the extraordinary light (which is equivalent to the plane of polarization of the passing light) is modulated in response to the electric field applied thereto via the reflection mirror MM of conductive material of the read head Hr. The readout operation in this embodiment is the same as those in the embodiments of FIGS. 17 and 19.

In this embodiment, the incident beam is reflected by the reflection mirror MM of conductive material at a rate of 100%. Accordingly, a surface potential of the charge hold layer CHL to be detected can be detected with a high sensitivity. Further, the reflection mirror MM of conductive material can be easily fabricated by applying, e.g., the vacuum film deposition method thereto.

Meanwhile, the resolution in detection of the surface potential by the read head is determined by the dimension of the reflection mirror MM of conductive material and the distance between the surface of the CHL and the reflection mirror MM of conductive material in the read head. Accordingly, in order to improve a resolution in detection of the surface potential distribution on the charge hold layer CHL to be detected, it is required that the distance between the surface of the charge hold layer CHL and the reflection mirror MM is kept to be very small, and that the dimension of the reflection mirror MM of conductive material in the read head is made to be very small. However in reality, it is difficult to make them in such small dimensions for performing a detecting operation.

Figure 21:
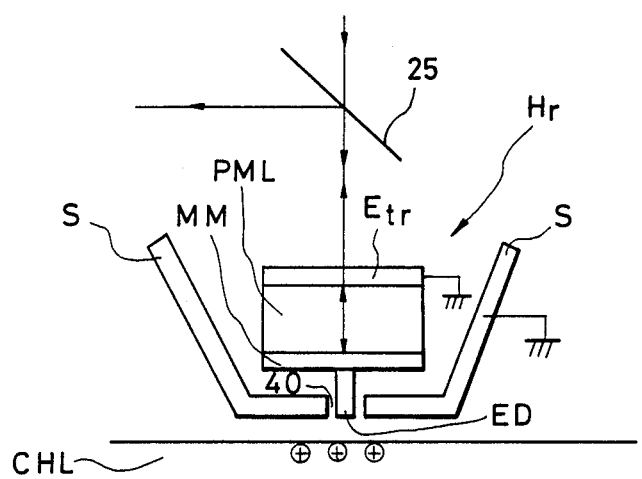
FIG. 21 is an enlarged cross sectional view showing a read head portion in a thirteenth embodiment of a reproducing apparatus according to this invention.

Referring to FIG. 21, there is shown a thirteenth embodiment of this invention which has been made for the purpose of solving such problems wherein only the read head Hr is enlarged for showing details. In this embodiment, there is employed an arrangement such that a needle like electrode ED of a conductive material is projectedly provided on the reflection mirror MM of conductive material, and that there is provided an electrostatic shielding body S provided with a throughhole 40 through which the needle-like electrode ED of conductive material is protruding.

The read head Hr shown in FIG. 21 can detect a surface potential distribution on the charge hold layer CHL with a high resolution by the needle electrode ED protruding through the hole 40 provided in the electrostatic shielding body S.

In the embodiments of FIGS. 20 and 21, the read head is constructed so as to perform a controlled scanning with high precision positioning in order that a charge latent image of the recording medium can be precisely obtained.

By using very small conductive mirror MM or needle like electrodes ED, a sufficient resolution can be obtained.

Figure 22:
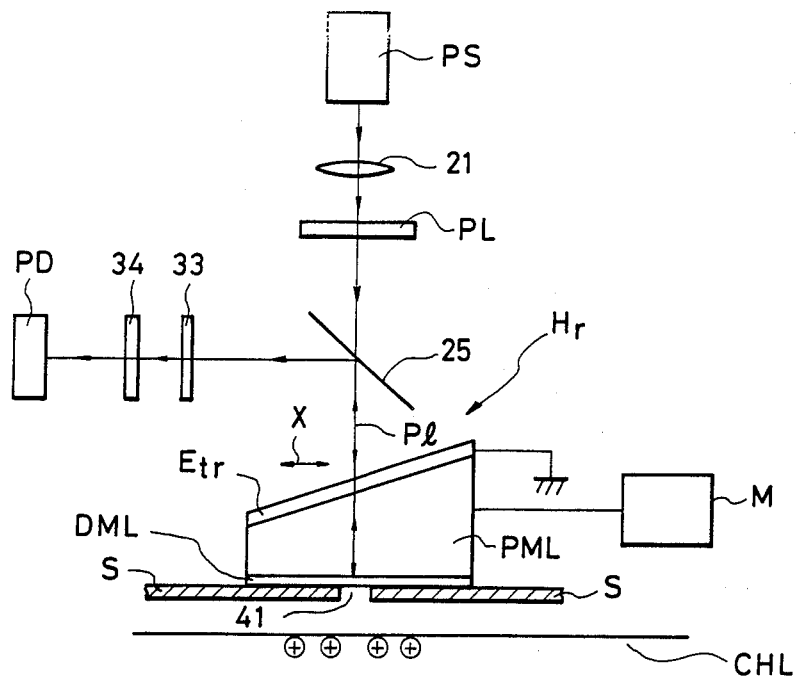
FIG. 22 is a schematic diagram showing an arrangement of a fourteenth embodiment of a reproducing apparatus according to this invention.

Referring to FIG. 22, there is shown a side view of an arrangement of a fourteenth embodiment of this invention. Since the configuration of FIG. 22 is the same as that of the embodiment shown in FIG. 17 except for only the read head Hr, the same components as those in FIG. 17 are designated by the same reference numerals, respectively, and their explanation will be omitted.

The read head Hr is of a multilayer structure comprising a transparent electrode Etr, a photo modulation material layer member PML, and a dielectric mirror DML. The photo modulation material layer member PML in the read head Hr has a thickness progressively increased from one end to the other end as shown in FIG. 22.

Further, drive means M for moving the read head Hr in horizontal direction in FIG. 22 is provided. For this drive means M, either one of known means such as rack and pinion mechanism, cam mechanism, or linear motor may be used.

Accordingly, when the relative position between the read head Hr and a laser beam Pl incident thereto is shifted in a direction as indicated by an arrow X in the figure, which is perpendicular to the travelling direction of the incident laser beam the laser beam is passed at places different in thickness of the photo modulation material layer member PML.

The above-mentioned construction has been made for the reason described below. Namely, when the distance between the read head and the charge hold layer CHL changes, an output voltage of the detector changes accordingly. Further, the intensity of electric field varies according to a surface potential of the charge hold layer to be detected. And when the intensity exceed the half-wave voltage of the photo modulation material layer member of the read head, the output voltage of the detector is lowered. A prior art apparatus lacking this kind of adjustable function in sensitivity makes its operator inconvenient, so it has been required to take a measure therefor. The half-wave voltage means an intensity level of electric field which produces the phase difference of $Pi(\pi)$ between the ordinary light and the extraordinary light which pass through the photo modulation layer member.

In this embodiment, an electrostatic shielding body S having an opening 41 is provided in a traveling path of the laser beam Pl.

Attention is now drawn to the case where the relative position between the read head Hr and the laser beam Pl incident thereto is shifted in a direction as indicated by an arrow X in the figure. In such a case, how a voltage to be detected is varied as a result of the fact that the laser beam is passed at portions different in thickness t of the photo modulation material layer member PML of the read head Hr, will be described with reference to FIG. 23.

Figure 23:
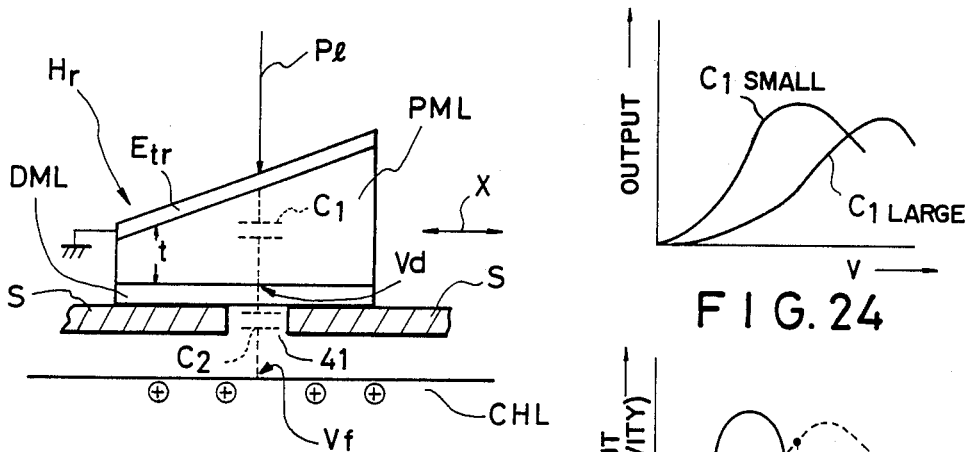
FIG. 23 is an explanatory view showing the principle in operation of a read head used in a fourteenth embodiment shown in FIG. 22.

A surface potential of the charge hold layer CHL of the recording medium is designated by Vf and the transparent electrode Etr in the read head Hr is grounded. In FIG. 23, C1 and C2 denote electrostatic capacities at portions shown, respectively. Thus, a voltage Vd detected by the read head Hr is equal to a value expressed as the following equation (1) obtained by dividing the surface potential Vf on the charge hold layer CHL by electrostatic capacity values C1 and C2.

$$Vd = C2 \cdot Vf/(C1 + C2) \ldots \tag{1}$$

The value of the electrostatic capacity C1 in the above equation (1) varies reversely in proportion to the thickness t of the photo modulation layer member PML.

Accordingly, by shifting the relative position between the read head Hr and the laser beam Pl incident thereto in a direction as indicated by the arrow X in the figure by the drive means M, it is possible to adjust the sensitivity of the read head Hr. How the sensitivity is adjusted is shown in FIG. 24.

Figure 24:
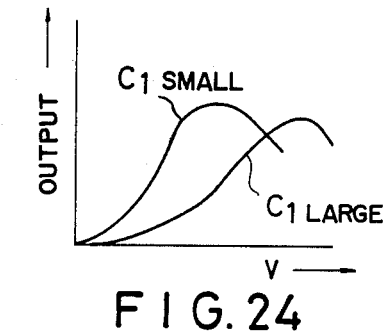
FIG. 24 is a graph showing a sensitivity of the fourteenth embodiment shown in FIG. 22.

In FIG. 24, the abscissa V denotes a field potential applied to the photo modulation layer member and the field potential takes a value in proportion to the surface potential Vf when the distance between the photo modulation layer member PML and the charge hold layer CHL is kept uniform.

The curve labeled "C1 small" in FIG. 24 indicates an output characteristic when the laser beam Pl is passed through the portion large in thickness t of the photo modulation layer member PML. Further, the curve labeled "C1 large" indicates an output characteristic when the laser beam Pl is passed through the portion small in thickness t of the photo modulation layer member PML.

Figure 25:
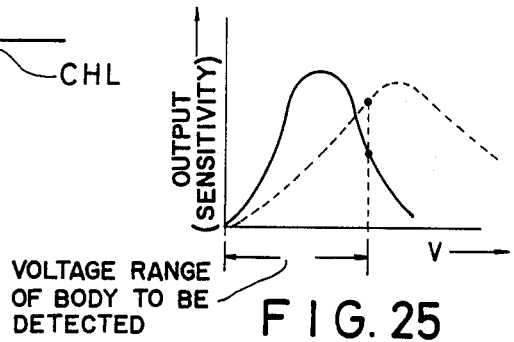
FIG. 25 is a graph showing a sensitivity adjustment of a read head.

The range indicated by the double headed arrow in the abscissa in FIG. 25 corresponds to the range of a distribution of a surface potential on the charge hold member layer CHL. Further, the curve indicated by a solid line and the curve indicated by dotted line respectively represent half-wavelength voltage characteristics of the two different thickness portions of the photo modulation layer member PML.

In accordance with this invention, a method is employed to shift the relative position between the read head Hr and the laser beam Pl incident thereto in a direction as indicated by the arrow X in the figure to pass the laser beam through the portion different in thickness t of the photo modulation layer member PML, thus making it possible to make an adjustment such that a characteristic as represented by the curve indicated by dotted line in the figure is provided in correspondence with the range of the distribution of a surface potential of the charge hold member layer CHL represented by the range indicated by the double headed arrow in the abscissa.

Referring to FIG. 26, there is shown, in a model form, an improved example of the dielectric mirror DML in the read head used in the apparatus of this invention.

In accordance with this example shown in FIG. 26, the dielectric mirror DML comprises a layered structure including an M number of layers formed on the photo modulation layer member PML as a substrate having a refractive index ns and an additional layer formed over the M number of layers as an outermost layer having a low refractive index nl and a high electric registivity (e.g. $SiO_2$). The thickness of this outermost layer solely is one half of the wavelength of light beam to pass through. The M number of stacked layers comprises materials having a low refractive index nl and a high refractive index nh alternately stacked in series, each of which stacked layers has a thickness one fourth of the wavelength of light beam to pass through.

The dielectric mirror in this embodiment is contrasted to conventional ones in the following point. One form of the conventional dielectric mirror is of a structure including an M number of stacked layers comprises materials having a low refractive index nl and a high refractive index nh alternately stacked in series, each of which stacked layers has a thickness one fourth of the wavelength of the light beam. The other form of the conventional dielectric mirror is of the same structure just mentioned above and an additional formed over the structure as an outermost layer having a low refractive index nl. The thickness of this outermost layer is one fourth of the wavelength of the light beam unlike the outermost layer of present invention having one half of the wavelength of the light beam.

Where the reproducing apparatus is in the environment of air (refractive index $n_o=1$) a conventional dielectric mirror having an outermost layer of high refractive index (e.g., $TiO_2$ having nh=2.3), exhibits a high reflection coefficient. But such outermost layer of material having a high refractive index with low electric resistivity, when the dielectric mirror DML in the read head Hr is in contact with the surface of the recording medium RM in order to read the charge image formed on the surface of the recording medium RM, it takes place that the charge image formed on the surface of the recording medium RM is erased by the outermost layer of the dielectric mirror DML having the low electric resistivity. On the other hand, when a layer of a quarter wavelength material having a high electric resistivity (e.g., $SiO_2$, $Al_2O_3$, etc. having a resistivity of $1\times10^{15}\Omega cm$) is used on the outermost layer of the dielectric mirror DML, the coefficient of reflection is reduced (nl=1.46 for $SiO_2$).

To solve the above problem, the arrangement shown in FIG. 26 contemplates providing a dielectric mirror in which the outermost layer is made of material of a high electric resistivity and a thickness of one-half of the wavelength of the light beam.

This structure has realized a read head having a dielectric mirror having a high reflectivity adapted to a reproducing apparatus for a charge latent image recording medium.

Since the dielectric mirror DML of the structure shown in FIG. 26 is such that a layer consisting of a material having a low refractive index nl (material showing a high electric resistivity) and having a thickness one half of the wavelength of the light beam is additionally provided as the outermost layer, it can exhibit a high coefficient of reflection to the light beam keeping a high electric resistivity of the outermost layer which contacts the recording medium RM.

Even if the outermost layer has a low refractive index nl, the coefficient of reflection is equivalent to in the case where the outermost layer has a high refractive index nh.

FIG. 27 is a graph for explaining that even if the constituent material of the outermost layer is a material having a low refractive index nl, the coefficient of reflection is increased by setting the thickness of the outermost layer to a multiple of integer of one half of the wavelength of the light beam passing therethrough.

FIG. 27 shows the relationship between the optical film thickness nl×dl (abscissa) and the coefficient of reflection (ordinate) in the case where a refractive index ns of a base plate is 1.5, a refractive index of the environment (air) is 1.0, and a single layer dielectric film having a refractive index of nl and a thickness of dl is provided on the base plate.

As seen from FIG. 27, when the optical film thickness nl×dl of the single layer dielectric film becomes equal to a multiple of an integer of one fourth of the wavelength of the light beam, the coefficient of reflection takes the extreme values. When the relationship of nl=ns holds, there occurs no change in the coefficient of reflection. Further, where the relationship expressed as $n_o<nl<ns$ holds, the coefficient of reflection becomes minimum when the optical film thickness nl·dl of the single layer dielectric film becomes equal to ¼, ¾ . . . of the wavelength of the light beam, and the coefficient of reflection becomes maximum when the optical film thickness nl·dl of the single layer dielectric film becomes equal to ½, 1 . . . of the wavelength of the light beam. Furthermore, where the relationship expressed as ns<nl, the coefficient of reflection becomes maximum when the optical film thickness nl·dl of the single layer dielectric film becomes equal to ¼, ¾ . . . of the wavelength of the light beam, and the coefficient of reflection becomes minimum when the optical film thickness nl·dl of the single layer dielectric film becomes equal to ½, 1 . . . of the wavelength of the light beam.

It is made clear from the curve of the reflection characteristic shown in FIG. 27 that since the dielectric mirror constructed as shown in FIG. 26 corresponds to the case where the relationship expressed as $n_o<nl<ns$ holds, the coefficient of reflection can be increased by selecting the optical film thickness nl·dl of the outermost layer as a multiple of an integer of one half of the wavelength of the light beam.

Figure 28:
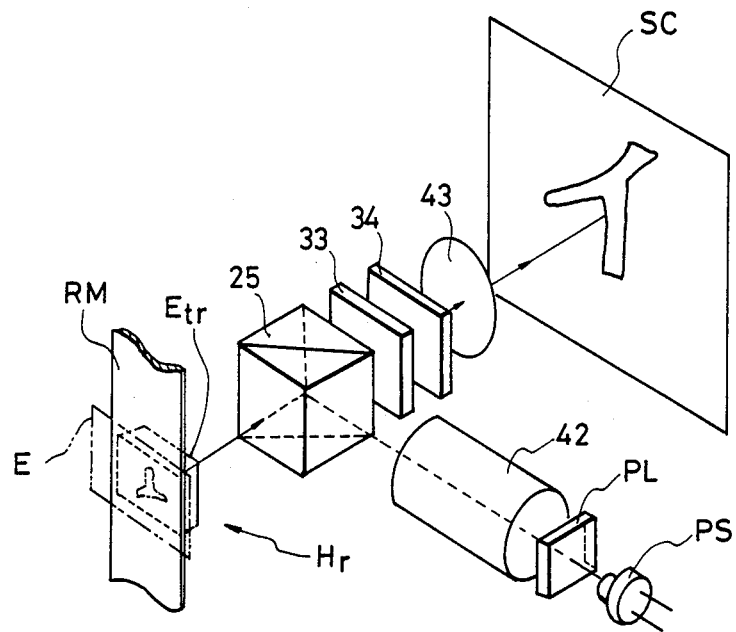
FIG. 28 is a schematic diagram showing an arrangement of a sixteenth embodiment of a reproducing apparatus according to this invention.

Referring to FIG. 28, there is shown a sixteenth embodiment of a reproducing apparatus according to this invention. Since the configuration shown in this figure is similar to that shown in FIG. 17, the same parts as those in FIG. 17 are designated by the same reference numerals, respectively, and their explanation will be omitted.

This embodiment differs from that of FIG. 17 in that a laser beam emitted from the light source PS is passed through the polarizer PL, and the cross section of the beam is expanded by a beam expander 42, and that a light detected by an analyzer 34 is projected onto a screen SC by an imaging lens 43.

It is to be noted that when a photo deflector capable of effecting a bidirectional deflection is substituted for the beam expander 42, reading of a charge image from the recording medium RM is two-dimensionally and sequentially carried out.

Figure 29:
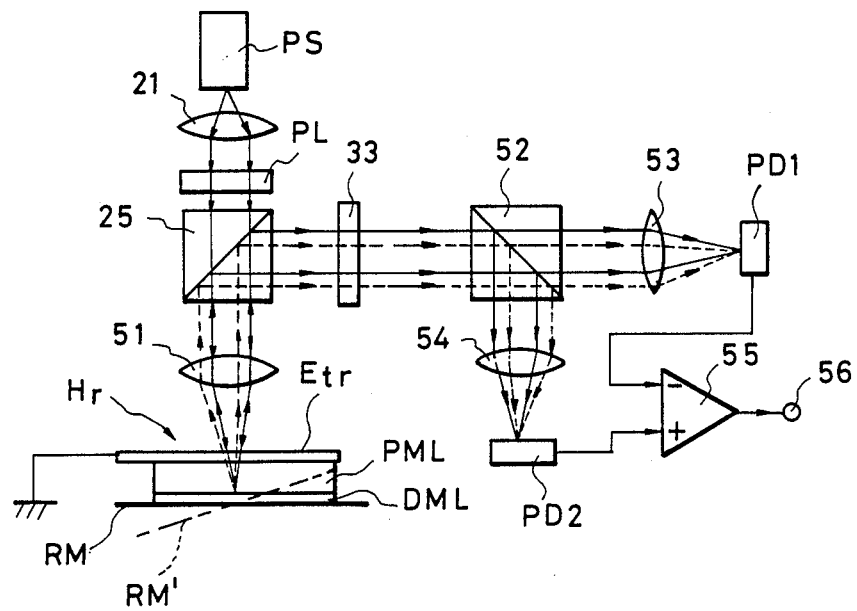
FIG. 29 is a schematic diagram showing an arrangement of a seventeenth embodiment of a reproducing apparatus according to this invention.

Referring to FIG. 29, there is shown an arrangement of a seventeenth embodiment of a reproducing apparatus according to this invention.

In accordance with the embodiment shown in FIG. 29, a laser beam irradiated from a laser light source PS is changed to a straight beam of light by a lens 21 provided when necessary, and is then reformed to a linear polarized light having a predetermined polarization plane by a polarizer PL provided optionally. Afterwards, the polarized light is incident to the beam splitter 25.

The laser beam passed through a beam splitter 25 is converged by a condenser lens 51 and is incident to the read head Hr. Thus, a focal point of the incident light takes place on the reflection plane of the dielectric mirror DML in the read head Hr. The construction and the operation of the read head Hr having dielectric mirror DML are as stated previously. By the charge pattern of the recording medium RM, the mode of an ordinary light and the mode of an extraordinary light (an angle of the polarization light in the case of this embodiment) produced in the photo modulation material layer member PML are modulated.

After a light from the read head Hr is reflected by the beam splitter 25, it is subjected to optical processing such that a P-wave and an S-wave have the same intensity, and is then incident to a polarization beam splitter 52.

A light transmitted through the polarization beam splitter 52 is converged to a photoelectric transformation surface of a photoelectric transducer (photodetector) PD1 by a condenser lens 53, and is transformed to an electric signal by the photoelectric transducer PD1. Further, a light reflected by the polarization beam splitter 52 is converged to a photoelectric transformation surface of a photoelectric transducer PD2 by a condenser lens 54, and is then transformed to an electric signal by the photoelectric transducer PD2.

Outputs from the photoelectric transducers PD1 and PD2 are delivered to respective input terminals of a differential amplifier 55. Thus, an output indicative of difference therebetween is output to the output terminal 56.

Also in the prior art, there has been proposed an apparatus constructed to develop, as an output signal, an output signal indicative of difference between the electric signals obtained by applying photoelectric transformation to P-wave and S-wave in an ordinary light and an extraordinary light emitted from the transparent electrode after reflected by the dielectric mirror of the read head Hr by individual photoelectric transducers, respectively.

Such a conventional apparatus is intended, to the same purpose as in the apparatus of this invention, to cancel noise from being produced in the output signal due to unevenness, scratching or dust on the reflection plane of the dielectric mirror DML in the read head Hr, or fluctuation of a laser beam, etc.

However, this can be done only when the P-wave and S-wave in the ordinary light and the extraordinary light output from the read head have the same intensity.

Namely, when the P-wave and the S-wave in the ordinary light and the extraordinary light output from the ordinary light and the extraordinary light output from the read head are different in intensity, cancelling of noise due to the above cause cannot be conducted.

For this reason, e.g., a wave-plate is used to adjust the intensity, so that the P-wave and S-wave in the ordinary light and the extraordinary light output from the read head have the same intensity.

However, where an incident angle of the light beam incident to the polarization beam splitter is shifted for some reason, the incident angle of the light beam incident to the polarization beam splitter, e.g., an inclination of the charge hold layer member, an inclination of the reflection plane of the dielectric mirror in the read head Hr, or other causes. This causes noise produced in the output signal.

The reproducing apparatus of this embodiment contemplates solving such problems, and differs from the conventional apparatus in that a scheme is employed to focus, by a focusing lens 51, the laser beam to a single point on the dielectric mirror DML in the read head Hr, thus allowing a light emitted from the transparent electrode Etr to be incident, by lens 51, to subsequent optical components as a light having a fixed angle to or parallel to an optical axis of the optical components.

With such a configuration, when the dielectric mirror DML is inclined with respect to the recording medium RM subject to reading as indicated by broken line in FIG. 29, a reflected light beam from the dielectric mirror DML at a point of reflection on a focal point of the lens 51 is incident by the lens 51 to a beam splitter 25 as a light beam having a fixed angle to or parallel to an optical axis thereof. Further, a light beam reflected by the beam splitter 25 is then incident to the polarization beam splitter 52 as a light parallel to the optical axis thereof. Thus, there is no possibility that even if the dielectric mirror DML in the read head Hr is inclined, an incident angle of a light beam incident to the polarization beam splitter 52 is changed.

Accordingly, when the state of the operation of the optical members constituting the apparatus is set in advance so that the P-wave and the S-wave in an ordinary light and in an extraordinary light incident to the polarization beam splitter 52 have the same intensity of light, an output signal from a differential amplifier 55, which is a signal indicative of difference between output signals from the two photoelectric transducers PD1 and PD2, is brought into a state where a d.c. signal component of the noise is satisfactorily eliminated at all times.

In the above-described embodiments, an approach is employed to direct a transmitted light and a reflected light from the polarization beam splitter 52 to respective focusing lenses 53 and 54 and further to respective photoelectric transducers PD1 and PD2 for transforming them to respective electric signals. However, if each of the photoelectric transducers PD1 and PD2 has a large enough light receiving area, the focusing lenses 53 and 54 may not be necessary. Further, where there is employed an arrangement such that optical computational processing for obtaining the difference is conducted on the lights from the polarization beam splitter 52, the photoelectric transducers PD1 and PD2 can be eliminated.

Referring to FIGS. 30 to 33, there are shown the eighteenth to twenty first embodiments of a reproducing apparatus according to this invention, respectively.

These apparatus are all of the reflection type and their elementary structure is similar to that of FIG. 17. Accordingly, the same parts as those in FIG. 17 are designated by the same reference numerals, respectively, and their explanation will be omitted.

Figure 30:
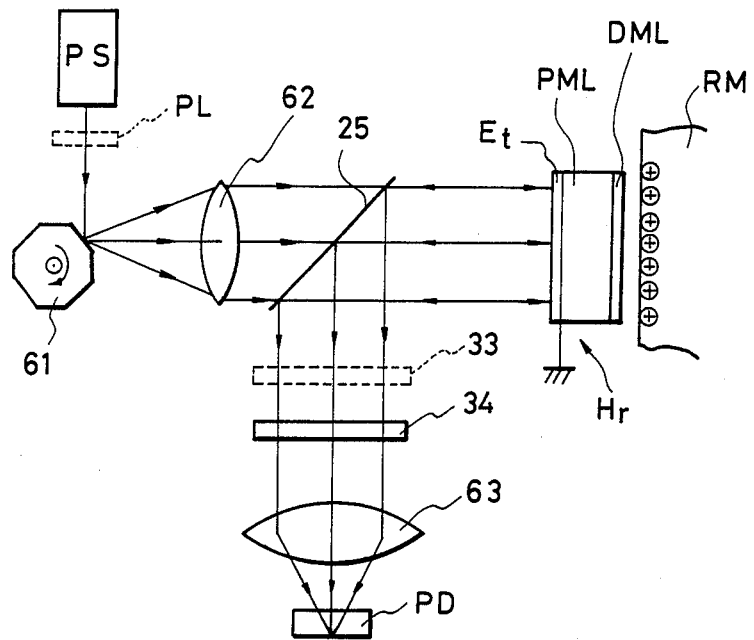
FIG. 30 is a schematic diagram showing an arrangement of an eighteenth embodiment of a reproducing apparatus according to this invention.

The embodiment shown in FIG. 30 is characterized in that after a laser beam irradiated from the light source PS is formed to a linear polarized light having a predetermined plane of polarization by a polarizer PL, it is deflected in a predetermined angular range by a polygon mirror 61 and is then incident to a doublet spherical lens 62.

Since a laser beam irradiated from the doublet spherical lens 62 is transmitted through the beam splitter 25 and is then incident to the read head Hr, the laser beam scans at a fixed linear speed on the same line in the read head Hr.

For means for deflecting the laser beam, an electric light deflector may be used in place of a mechanical light deflector means such as the polygon mirror 61.

In this embodiment, there is an arrangement such that after the light beam emitted from the read head Hr is reflected by the beam splitter 25, it is passed through a wave-plate 33 for adjusting an intensity of the light and an analyzer 34 for transforming a change in rotation of a plane of polarization of the light into a change in brightness, and is then incident to a condenser lens 63, a photoelectric transducer being arranged at the position of a focal point of the condenser lens 63.

Figure 31:
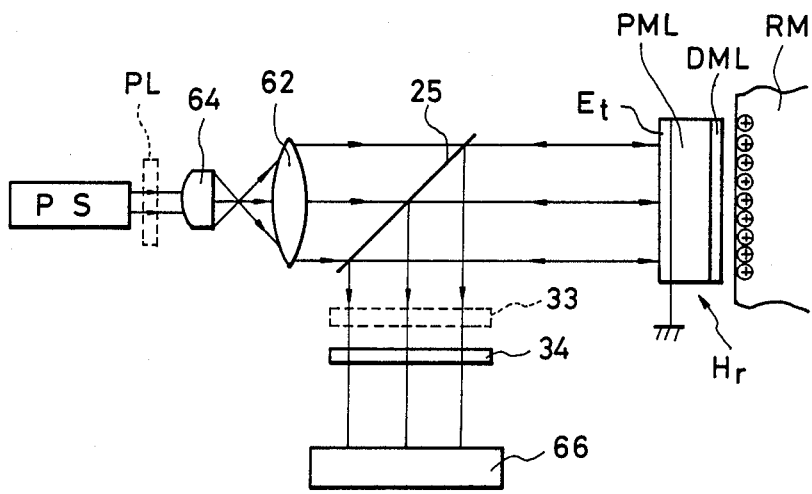
FIG. 31 is a schematic diagram showing an arrangement of an nineteenth embodiment of a reproducing apparatus according to this invention.

In the nineteenth embodiment shown in FIG. 31, after the laser beam irradiated from the light source PS is formed to a linear polarized light having a predetermined plane of polarization by a polarizer PL provided according to need, it is changed to a beam having a linear cross section by a cylindrical lens 64, and is incident to a lens 62.

The laser beam emitted from the lens 62 is passed through a beam splitter 25, and is incident to the read head Hr as a single linear beam.

Thereafter, a light emitted from the read head Hr is reflected by the beam-splitter 25, and is then incident to a line image sensor 66 through wave-plate 33 and analyzer 34. When the recording medium RM is moved relatively with respect to the read head Hr in a direction perpendicular to the plane of the drawing, an electric signal (video signal) having an amplitude varied in response to the electrical charges of the moved two-dimensional charge image on the recording medium RM, is obtained from the line image sensor.

It is to be noted that a scheme may be employed to displace incrementally the line image sensor 66 by a very small distance according to the vernier principle in a direction of pixel array of the sensor, and carrying out reading operations on the same charge image at every displacement of the sensor to compose an output signal therefrom resulting a high resolution video signal.

Figure 32:
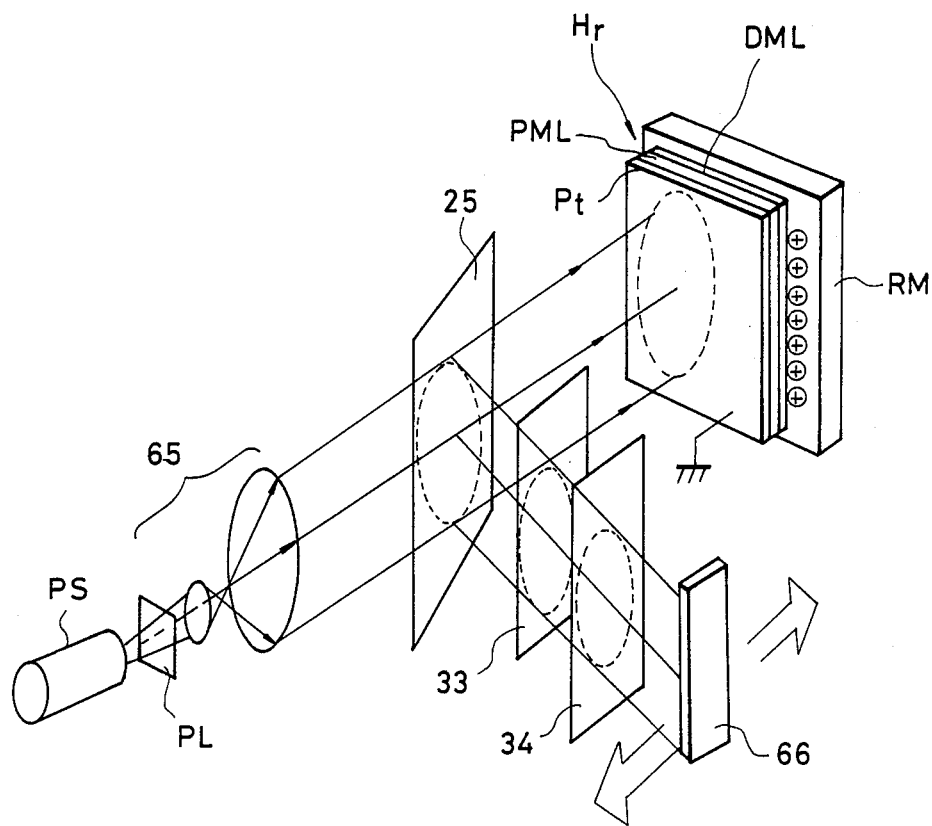
FIG. 32 is a schematic diagram showing an arrangement of a twentieth embodiment of a reproducing apparatus according to this invention.

In a twentieth embodiment of this invention shown in FIG. 32 and a twenty first embodiment of this embodiment shown in FIG. 33, after a laser beam irradiated from the laser light source PS is formed to a linear polarized light having a predetermined plane of polarization by polarizer PL, it is expanded to a laser beam having a large cross sectional diameter by a beam-expander 65, and is then incident to the beam-splitter 25. Then, the laser beam passed through the beam splitter 25 is incident to the read head Hr.

The difference between the two embodiments is as follows: In the case of the embodiment shown in FIG. 32, a light emitted from the read head Hr is finally incident to the line image sensor 66. On the other hand, in the case of the embodiment shown in FIG. 33, such a light is finally incident to the two-dimensional image sensor 67.

In case of the line image sensor, two-dimensional charge image on the recording medium RM is scanned by displacing the line image sensor in the direction of the arrow. In contrast, in case of the two-dimensional image sensor, two-dimensional charge image is easily read out from the sensor without displacing it.

It is to be noted that the term of "transparency" of the transparent electrode layer Etr used in respective embodiments is used as a meaning that the material is transparent to the incident reading light output from the light source PS, and that it is not necessarily transparent to the human eye.

Further, a light source to output an incoherent light such as a halogen lamp may be used as the light source PS together with a polarizer element.

Furthermore, a liquid crystal or PLZT both of the scattering type may be used as the light modulating member. The former is constituted by scattering liquid crystal particles into a high molecular material which serves as a binder. Where such a scattering type liquid crystal is used, since transformation to intensity variation of light is conducted within the material, an image can be directly observed without having an analyzer. Further, since it does not employ an analyzer for transforming the light into intensity modulation, utilization of the light is improved, so that powersaving is possible.

In addition, the processes disclosed elsewhere in this specification may be applicable to an optical computer as an optical process in the optical computer.

We claim:

1. A reproducing apparatus for a charge latent image recording medium comprising:
   an electromagnetic radiation source,
   an optical system for leading an electromagnetic radiation ray emitted from said electromagnetic radiation source in a direction toward a recording medium on which an object information to be read is prerecorded as a charge latent image, and
   a read head arranged closely facing to said recording medium and arranged in series in a travelling path of said electromagnetic radiation ray,
   said read head being of a multilayer structure comprising a support base plate, a photo modulation material layer for generating a mode modulation of said electromagnetic radiation ray which passes the photo modulation material layer therethrough in response to intensity of an electric field by said charge latent image, and an electrode for applying a predetermined electric field to said photo modulation layer, and for allowing to receive the electromagnetic radiation ray in a read wavelength range and transmit thereof to said photo modulation layer, an output surface facing to a process means for emitting thereto the electromagnetic ray having passed through the electrode and the photo modulation layer, said process means processing the electromagnetic ray modulated by going through the photo modulation material layer and outputted from the output surface.

2. The reproducing apparatus according to claim 1, wherein said process means is disposed opposite to said electromagnetic radiation source with respect to said recording medium.

3. The reproducing apparatus according to claim 1, wherein said process means is disposed at the same side of said electromagnetic radiation source with respect to said recording medium and is facing to said output surface, and said read head further comprises reflection means for reflecting said radiation ray passes through said photo modulation layer in a direction toward said output surface, said reflection means being disposed in close to said recording medium.

4. The reproducing apparatus according to claim 1, wherein said process means is disposed at the same side of said electromagnetic radiation source with respect to said recording medium and is facing to said output surface, and said recording means comprises reflection means for reflecting said radiation ray passed through said photo modulation layer in a direction toward said emitting surface.

5. The reproducing apparatus according to claim 1, wherein said process means includes a photoelectric transformation means for transforming a mode modulated electromagnetic radiation ray taken out from said read head to an electrical signal.

6. The reproducing apparatus according to claim 1, wherein said process means includes means for transforming a mode modulated electromagnetic radiation ray taken out from said read head to a viewable light.

7. The reproducing apparatus according to claim 1, wherein said photo modulation layer being a material having an electrooptic effect.

8. The reproducing apparatus according to claim 1, wherein said photo modulation layer being a scattering material which changes the degree of scattering of the incident electromagnetic radiation ray in response to the intensity of an applied electric field.

9. The reproducing apparatus according to claim 1, wherein pictorial images separated into three colors are recorded on said recording medium as a group in which three colored images are aligned with and adjacent to each other.

10. The reproducing apparatus according to claim 5, wherein said reproducing apparatus further comprises a deflector for deflecting and supplying said electromagnetic radiation ray generated from said radiation source to said read head, an output taken out from said read head being delivered to said photoelectric transformation means.

11. The reproducing apparatus according to claim 5, wherein said photoelectric transformation means has a line sensor, and said reproducing apparatus further comprises a supply means for forming a cross section of the electromagnetic radiation ray generated from said electromagnetic radiation source into a linearly extended from and supplying thereof to said read head, an output taken out from said read head being supplied to the line sensor arranged correspondingly with the linearly extended form of the cross section of the electromagnetic radiation ray.

12. The reproducing apparatus according to claim 3, wherein said reflection means is formed sufficiently small with respect to the pixel size of the charge latent image to be read, said reflection means being made of a conductive material.

13. The reproducing apparatus according to claim 3, wherein said reflection means is made of conductive material having a small needle-shaped electrode protruding toward said recording medium.

14. The reproducing apparatus according to claim 3, wherein said reflection means is composed of a plurality of reflecting mirrors divided with respect to pixels of a charge latent image to be read.

15. The reproducing apparatus according to claim 14, wherein said reflecting mirrors are made of a high conductive material.

16. The reproducing apparatus according to claim 14, wherein said reflecting mirrors are made of a dielectric crystal material.

17. The reproducing apparatus according to claim 1, wherein said apparatus further comprises means for enlarging the cross section of the beam of the electromagnetic radiation ray generated from the electromagnetic radiation source.

18. The reproducing apparatus according to claim 17, wherein said photoelectric transformation means has a line sensor.

19. The reproducing apparatus according to claim 17, wherein said photoelectric transformation means has a two-dimensional image sensor.

20. The reproducing apparatus according to claim 1, wherein said photo modulation layer is made of liquid crystal.

21. The reproducing apparatus according to claim 20, wherein said read head has at least one base plate formed of a ferroelectric material, said plate being in proximity with said recording medium.

22. The reproducing apparatus according to claim 3, wherein said photo modulation layer is formed in a manner that a thickness thereof varies progressively from one end to the other end of the read head resulting in a distance between said reflection means and said electrode varying progressively, and said reproducing apparatus further comprises moving means for moving said read head along a line perpendicular to a traveling path of the electromagnetic radiation ray and extending from the one end and the other end in order to select an optimum operation point.

23. The reproducing apparatus according to claim 3, wherein said reflection means is a dielectric reflecting layer, said reflection layer being multilayer structure including first layers consisting of a material having a low refractive index and having a thickness of one fourth of a wavelength of said electromagnetic radiation ray and second layers consisting of a material having a high refractive index and having a thickness one fourth of a wavelength of said electromagnetic radiation ray, said both layers being alternately laminated, and said multilayer structure further laminating a layer consisting of a material having a low refractive index and having a thickness one half of the wavelength of said electromagnetic radiation ray as an outermost layer which is facing the recording medium.

24. The reproducing apparatus according to claim 1, wherein said process means comprises a polarization beam splitter to which a modulated electromagnetic radiation ray output from said read head is incident and difference component output means for providing difference component between a transmitted light and a reflected light both of said modulated electromagnetic radiation ray from said polarization beam splitter.

25. The reproducing apparatus according to claim 24, wherein said difference component output means comprises a first and a second converter for converting said transmitted light and said reflected light into electric signals, respectively, and a comparator which detects difference between outputs of said first converter and said second converter.

* * * * *